United States Patent
Hong et al.

(10) Patent No.: US 9,081,244 B2
(45) Date of Patent: Jul. 14, 2015

(54) LIQUID CRYSTAL DISPLAY AND MANUFACTURING METHOD THEREOF

(71) Applicant: Samsung Display Co., Ltd., Yongin, Gyeonggi-Do (KR)

(72) Inventors: Ki Pyo Hong, Suwon-si (KR); Swae-Hyun Kim, Asan-si (KR); Jae Hwa Park, Gumi-si (KR); Je Hyeong Park, Hwaseong-si (KR); Young Goo Song, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 111 days.

(21) Appl. No.: 13/844,772

(22) Filed: Mar. 15, 2013

(65) Prior Publication Data
US 2014/0125908 A1 May 8, 2014

(30) Foreign Application Priority Data
Nov. 6, 2012 (KR) .......................... 10-2012-0124720

(51) Int. Cl.
*G02F 1/1362* (2006.01)
*G02F 1/1341* (2006.01)
*G02F 1/1333* (2006.01)
*G02F 1/1335* (2006.01)

(52) U.S. Cl.
CPC ........ *G02F 1/136209* (2013.01); *G02F 1/1333* (2013.01); *G02F 1/1341* (2013.01); *G02F 1/133512* (2013.01)

(58) Field of Classification Search
None
See application file for complete search history.

(56) References Cited

U.S. PATENT DOCUMENTS

| | | | |
|---|---|---|---|
| 6,141,072 A | 10/2000 | Drabik et al. | |
| 7,123,319 B2 | 10/2006 | Broer et al. | |
| 8,405,814 B2 * | 3/2013 | Eun et al. | 349/189 |
| 2005/0151918 A1* | 7/2005 | Park et al. | 349/150 |
| 2006/0250536 A1 | 11/2006 | Kim | |
| 2006/0256276 A1 | 11/2006 | Sha et al. | |
| 2012/0062448 A1 | 3/2012 | Kim et al. | |
| 2013/0308071 A1 | 11/2013 | Kim et al. | |
| 2013/0335664 A1 | 12/2013 | Shim et al. | |

FOREIGN PATENT DOCUMENTS

| | | |
|---|---|---|
| EP | 0294900 | 12/1988 |
| JP | 05-188359 | 7/1993 |
| JP | 2002-244124 | 8/2002 |
| JP | 2010-219094 | 9/2010 |
| KR | 10-2002-0009202 | 2/2002 |

(Continued)

OTHER PUBLICATIONS

European Search Report corresponding to European Patent Application No. 13160558.6, Oct. 11, 2013.

*Primary Examiner* — Richard Kim
(74) *Attorney, Agent, or Firm* — Innovation Counsel LLP

(57) ABSTRACT

A liquid crystal display device may include a substrate. The liquid crystal display device may further include a pixel electrode disposed on the substrate. The liquid crystal display device may further include a common electrode overlapping the pixel electrode, wherein a liquid crystal injection hole is formed through at least the common electrode. The liquid crystal display device may further include a liquid crystal layer disposed between the pixel electrode and the common electrode. The liquid crystal display device may further include a light-blocking element disposed inside the liquid crystal injection hole.

10 Claims, 14 Drawing Sheets

(56) References Cited

FOREIGN PATENT DOCUMENTS

| KR | 10-2003-0063656 | 7/2003 |
|---|---|---|
| KR | 10-2011-0132819 | 12/2011 |
| KR | 10-2013-0129008 | 11/2013 |
| KR | 10-2013-0140325 | 12/2013 |
| WO | 98-45751 | 10/1998 |

* cited by examiner

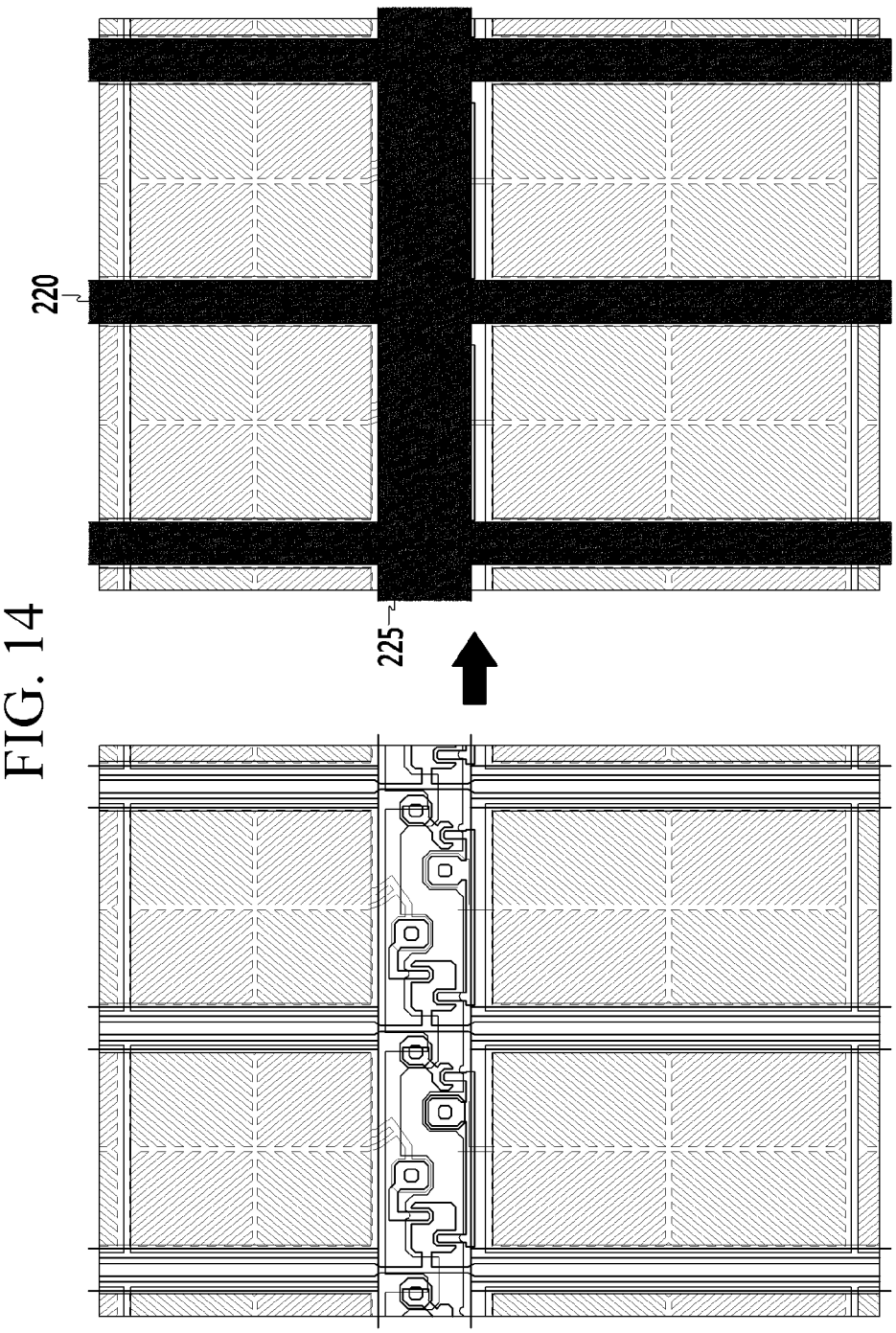

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2012-0124720 filed in the Korean Intellectual Property Office on Nov. 6, 2012, the entire contents of which are incorporated herein by reference.

BACKGROUND (a) Technical Field

The present invention is related to a liquid crystal display (i.e., liquid crystal display device) and a manufacturing method thereof.

(b) Description of the Related Art

A liquid crystal display typically includes two panels with field generating electrodes (such as a pixel electrode and a common electrode) and a liquid crystal layer interposed between the panels.

The liquid crystal display may generate an electric field in the liquid crystal layer by applying voltage to the field generating electrodes. The electric field may determine the direction of liquid crystal molecules of the liquid crystal layer, thereby controlling polarization of incident light so as to control displayed images.

A liquid crystal display manufacturing process may include the following steps: forming a sacrificial layer with a photoresist, removing the sacrificial layer by an etching process after coating a support member thereon, and filling liquid crystal through an injection hole into an empty space that is resulted from removing the sacrificial layer. Typically, a height of the empty space is not large. If the liquid crystal injection hole is partially blocked by another constituent element formed below the empty space, the liquid crystal injection may be substantially difficult and time-consuming.

The above information disclosed in this Background section is for enhancement of understanding of the background of the invention. The Background section may contain information that does not form the prior art that is already known in this country to a person of ordinary skill in the art.

SUMMARY

Embodiments of the present invention may enable efficient formation of a liquid crystal layer in manufacturing a liquid crystal display device, thereby minimizing the manufacturing time and/or minimizing the manufacturing cost. Embodiments of the present invention may effectively seal liquid crystal material in liquid crystal display devices to ensure optimal performance of the liquid crystal display devices.

One or more embodiments of the invention may be related to a liquid crystal display device that may include a substrate. The liquid crystal display device may further include a pixel electrode disposed on the substrate. The liquid crystal display device may further include a common electrode that overlaps the pixel electrode, wherein a liquid crystal injection hole is formed through at least the common electrode. The liquid crystal display device may further include a liquid crystal layer disposed between the pixel electrode and the common electrode. The liquid crystal display device may further include a first light-blocking element disposed inside the liquid crystal injection hole.

The first light-blocking element may be formed after the formation of the liquid crystal layer; therefore, the first light-blocking element may not obstruct the formation of the liquid crystal layer. Advantageously, the liquid crystal layer may be efficiently formed, and therefore the manufacturing time and/or the manufacturing cost of the liquid crystal display device may be minimized. The first light-blocking element may prevent light leakage and may seal the liquid crystal injection hole to prevent liquid crystal leakage. Advantageously, the performance of the liquid crystal display device may be optimized.

In one or more embodiments, the liquid crystal display device may include a transistor electrically connected to the pixel electrode. The liquid crystal display device may further include a gate line electrically connected to the transistor and configured to transmit a gate signal to the transistor. The first light-blocking element extends parallel to the gate line and overlaps the transistor.

In one or more embodiments, the first light-blocking element is disposed between a first portion of the liquid crystal layer and a second portion of the liquid crystal layer.

In one or more embodiments, a portion of the liquid crystal layer is disposed between the first light-blocking element and the substrate.

In one or more embodiments, the first light-blocking element directly contacts the liquid crystal layer.

In one or more embodiments, the liquid crystal display device may include a capping layer that is made of a material (e.g., a transparent material) different from a material of the first light-blocking element. A first portion of the capping layer is disposed inside the liquid crystal injection hole and is disposed between the first light-blocking element and the liquid crystal layer.

In one or more embodiments, the first light-blocking element is disposed between a second portion of the capping layer and a third portion of the capping layer.

In one or more embodiments, the second portion of the capping layer and the third portion of the capping layer are disposed between a first portion of the common electrode and a second portion of the common electrode.

In one or more embodiments, the liquid crystal display device may include a second light-blocking element. The second light-blocking element is directly connected to the first light-blocking element and extending substantially perpendicular to the first light-blocking element.

In one or more embodiments, the liquid crystal display device may include a second light-blocking element. The first light-blocking element is disposed at a first side with respect to the liquid crystal layer. The second light-blocking element is disposed at a second side with respect to the liquid crystal layer and extends substantially perpendicular to the first light-blocking element in a plan view of the liquid crystal display device.

One or more embodiments of the invention may be related to a method for manufacturing a liquid crystal display device. The method may include the following steps: providing a pixel electrode on a substrate; providing a sacrificial layer on the pixel electrode; providing a common electrode on the sacrificial layer; forming a liquid crystal injection hole through at least the common electrode; removing the sacrificial layer through the liquid crystal injection hole for forming a cavity; injecting liquid crystal through the liquid crystal injection hole into the cavity for forming a liquid crystal layer; and after the injecting, providing a first light-blocking element in the liquid crystal injection hole.

Since the first light-blocking element is provided after the liquid crystal has been injected, the first light-blocking element may not obstruct the injection of the liquid crystal. Advantageously, the liquid crystal layer may be efficiently formed, and therefore the manufacturing time and/or the manufacturing cost of the liquid crystal display device may be minimized. The first light-blocking element may prevent light leakage and may seal the liquid crystal injection hole to prevent liquid crystal leakage. Advantageously, the performance of the liquid crystal display device may be optimized.

In one or more embodiments the method may include the following steps: providing a photoresist pattern that partially overlaps the common electrode; using the photoresist pattern as a mask in the forming the liquid crystal injection hole; and removing the photoresist pattern when performing the removing the sacrificial layer.

In one or more embodiments the method may include the following steps: providing a transistor electrically that is connected to the pixel electrode; and providing a gate line that is electrically connected to the transistor and is configured to transmit a gate signal to the transistor, wherein the first light-blocking element extends parallel to the gate line and overlaps the transistor.

In one or more embodiments the method may include the following step: disposing the first light-blocking element between a first portion of the liquid crystal layer and a second portion of the liquid crystal layer.

In one or more embodiments the method may include the following step: disposing the first light-blocking element such that a portion of the liquid crystal layer is disposed between the first light-blocking element and the substrate.

In one or more embodiments the method may include the following step: disposing the first light-blocking element such that the first light-blocking element directly contacts the liquid crystal layer.

In one or more embodiments the method may include the following steps: forming a capping layer using a material that is different from a material of the first light-blocking element; disposing a first portion of the capping layer inside the liquid crystal injection hole; and disposing the first light-blocking element such that the first portion of the capping layer is disposed between the first light-blocking element and the liquid crystal layer.

In one or more embodiments the method may include the following step: disposing the first light-blocking element such that the first light-blocking element is disposed between a second portion of the capping layer and a third portion of the capping layer.

In one or more embodiments the method may include the following step: forming a second light-blocking element when forming the first light-blocking element, the second light-blocking element being directly connected to the first light-blocking element and extending substantially perpendicular to the first light-blocking element.

In one or more embodiments the method may include the following step: forming a second light-blocking element before the forming the liquid crystal layer, wherein the first light-blocking element is disposed at a first side with respect to the liquid crystal layer, and wherein the second light-blocking element is disposed at a second side with respect to the liquid crystal layer and extends substantially perpendicular to the first light-blocking element in a plan view of the liquid crystal display device.

One or more embodiments of the present invention may be related to a liquid crystal display that may include the following elements: an insulation substrate; a pixel electrode formed on the insulation substrate; a microcavity formed on the pixel electrode; a liquid crystal layer positioned in the microcavity and on the pixel electrode; a common electrode for forming an electric field with the pixel electrode; a roof layer having a liquid crystal injection hole; and a first black matrix positioned in the liquid crystal injection hole.

The first black matrix may extend in a horizontal direction.

The liquid crystal display may further include a thin film transistor electrically connected with the pixel electrode on the insulation substrate. The first black matrix is positioned in a transistor formation region where the thin film transistor may be formed.

The liquid crystal display may further include the following elements: a data line electrically connected with the thin film transistor on the insulation substrate and extending in a vertical direction; and a second black matrix, the second black matrix overlapping the data line and extending along the data line.

The second black matrix, which overlaps the data line, may not be formed in the transistor formation region.

The second black matrix and the first black matrix may form a lattice structure having openings in a plan view of the liquid crystal display.

The second black matrix may be formed below the pixel electrode or on the roof layer.

The first black matrix may directly contact the liquid crystal layer.

The liquid crystal display may further include a capping layer positioned between the liquid crystal layer and the first black matrix.

The capping layer may be positioned on the roof layer.

One or more embodiments of the present invention may be related to a manufacturing method of a liquid crystal display. The method may include the following steps: forming a pixel electrode on an insulation substrate; forming a sacrificial layer on the pixel electrode; forming a common electrode on the sacrificial layer; forming a roof layer on the common electrode; forming a liquid crystal injection hole through at least one of the roof layer and the common electrode; forming a microcavity by removing the sacrificial layer through the liquid crystal injection hole; injecting liquid crystal in the microcavity through the liquid crystal injection hole; and forming a first black matrix in the liquid crystal injection hole.

The method may further include forming a thin film transistor electrically connected with the pixel electrode on the insulation substrate. The first black matrix may be formed in the transistor formation region where the thin film transistor is formed.

The method may further include the following steps: forming a data line on the insulation substrate; and forming a second black matrix, the second black matrix overlapping the data line and extending along the data line.

The second black matrix, which overlaps the data line, may not be formed in the transistor formation region.

The second black matrix may be positioned below the pixel electrode. The second black matrix and the first black matrix may form a lattice structure having openings in a plan view of the liquid crystal display.

The second black matrix may be formed on the roof layer and may be directly connected with the first black matrix to form a lattice structure having openings.

The first black matrix may directly contact the liquid crystal layer.

The method may further include forming a capping layer that includes a first portion disposed between the liquid crystal layer and the first black matrix.

The capping layer may include a second portion, wherein the second portion is positioned on the roof layer.

The sacrificial layer may be formed of a photoresist material. A photoresist pattern may be positioned on the roof layer and may be used as a mask for forming the liquid crystal injection hole. The sacrificial layer and the photoresist pattern may be substantially simultaneously removed in a same wet-etching process.

According to one or more embodiments of the present invention, since the first black matrix is formed after the liquid crystal injection hole has been formed and after the liquid crystal molecules have been injected, the liquid crystal molecules may be efficiently injected without obstruction. Advantageously, the time required for the liquid crystal injection may be minimized, and the liquid crystal material may sufficiently fill the microcavity. In one or more embodiments, the photoresist and the sacrificial layer may be removed in a same process step. Advantageously, manufacturing may be simplified, and manufacturing time and/or manufacturing cost may be saved.

BRIEF DESCRIPTION OF THE DRAWINGS

FIG. 14 is a plan view illustrating positions of a first black matrix and a second black matrix in the liquid crystal display of FIGS. 12 and 13 according to one or more embodiments of the present invention.

DETAILED DESCRIPTION OF EMBODIMENTS

Figure 1:
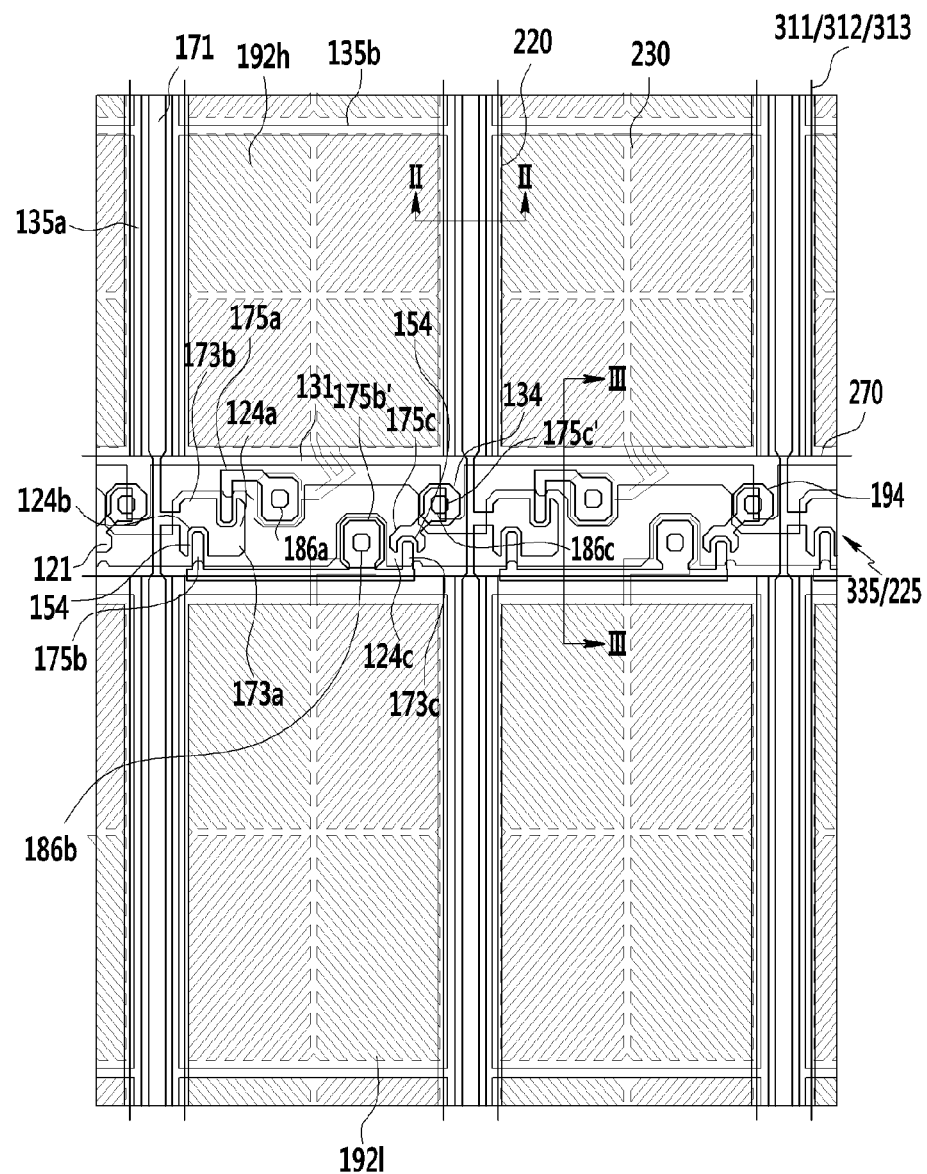
FIG. 1 is a plan view illustrating a liquid crystal display according to one or more embodiments of the present invention.

Embodiments of the present invention will be described more fully hereinafter with reference to the accompanying drawings. As those skilled in the art would realize, the described embodiments may be modified in various ways, all without departing from the spirit or scope of the present invention.

In the drawings, the thickness of layers, films, panels, regions, etc., may be exaggerated for clarity. Like reference numerals may designate like elements in the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present (except environmental elements such as air).

Although the terms first, second, etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, etc. may also be used herein to differentiate different categories of elements. For conciseness, the terms first, second, etc. may represent first-type (or first-category), second-type (or second-category), etc., respectively.

Hereinafter, a liquid crystal display (i.e., a liquid crystal display device) according to one or more embodiments of the present invention will be described in detail with reference to FIGS. 1 to 3.

Figure 2:
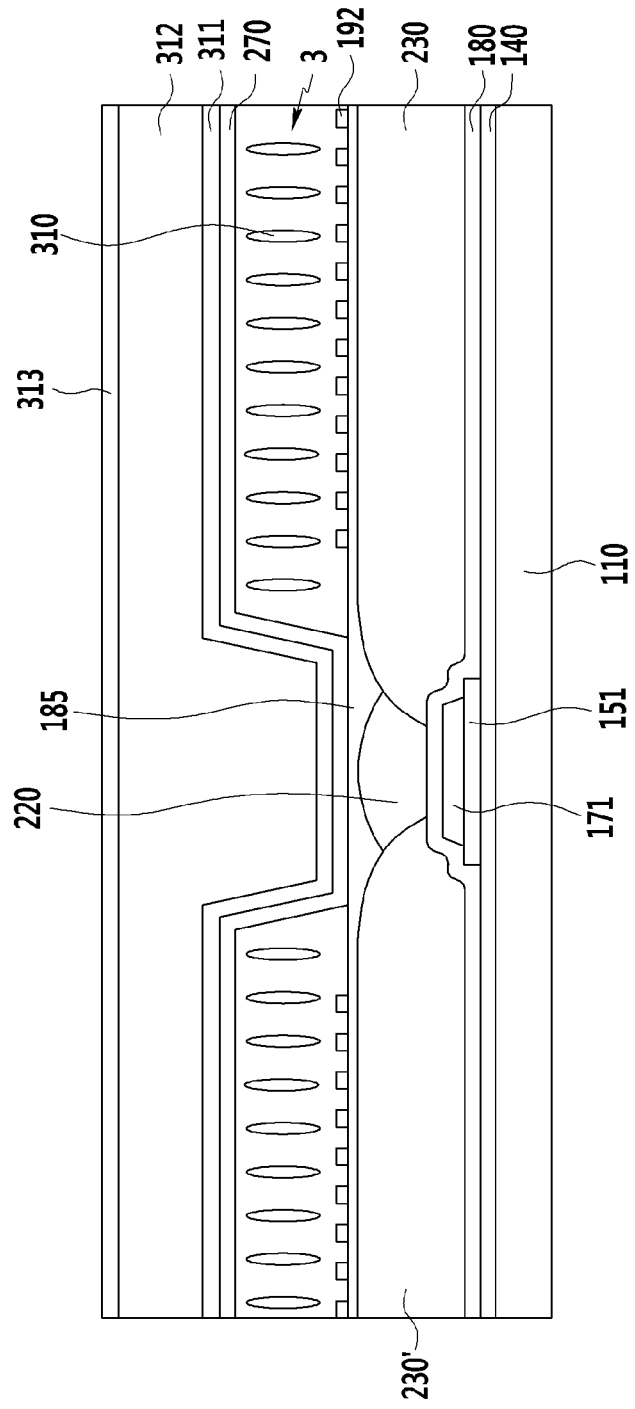
FIG. 2 is a cross-sectional view taken along line II-II indicated in FIG. 1.
Figure 3:
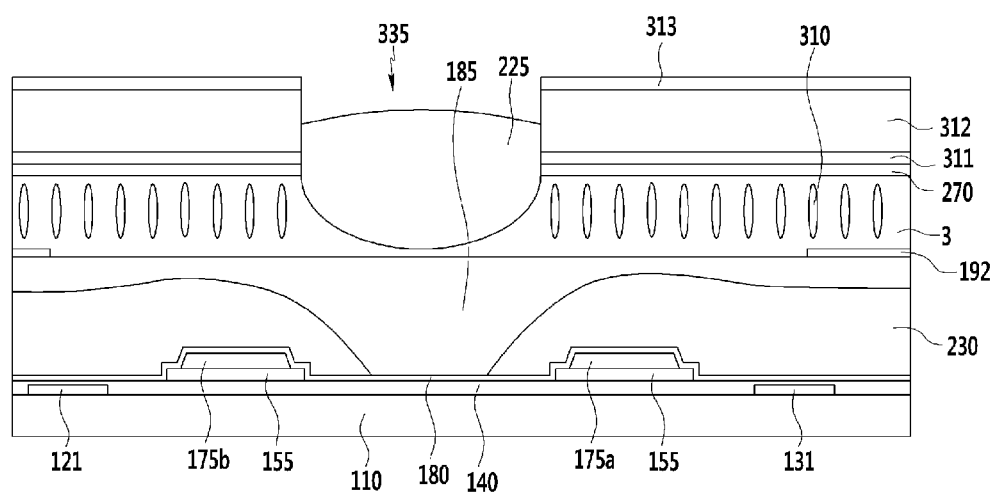
FIG. 3 is a cross-sectional view taken along line III-III indicated in FIG. 1.

FIG. 1 is a plan view illustrating a liquid crystal display according to one or more embodiments of the present invention, FIG. 2 is a cross-sectional view taken along line II-II indicated in FIG. 1, and FIG. 3 is a cross-sectional view taken along line III-III indicated in FIG. 1.

In the liquid crystal display, gate line 121 (for transmitting a gate signal) and a storage voltage line 131 are formed on an insulation substrate 110 made of transparent glass, transparent plastic, or a different transparent substrate material. The gate line 121 includes a first gate electrode 124a, a second gate electrode 124b, and a third gate electrode 124c. The storage voltage line 131 includes storage electrodes 135a and 135b and a protrusion 134 protruding in the gate line 121 direction (i.e., the horizontal direction). The storage electrodes 135a and 135b may form a structure that surrounds a first subpixel electrode 192h and a second subpixel electrode 192l of a front pixel. A horizontal portion of the storage electrode 135b may be one wiring which is not separated from the horizontal portion of the front pixel.

A gate insulating layer 140 is formed on the gate line 121 and the storage voltage line 131. A semiconductor 151 positioned below a data line 171 (for transmitting image signals), portions of a semiconductor 155 positioned below one or more drain electrodes (e.g., a drain electrode 175b), and a semiconductor 154 positioned at a channel part of a thin film transistor are formed on the gate insulating layer 140.

A plurality of ohmic contacts may be respectively formed on the semiconductors 151, 154, and 155 and between the data line 171 and the one or more source electrodes and/or the one or more drain electrodes, the ohmic contacts being omitted in the drawings.

On the semiconductors 151, 154, and 155 and the gate insulating layer 140, a set of data conductors that includes a plurality of data lines 171 including a first source electrode 173a and a second source electrode 173b, a first drain electrode 175a, a second drain electrode 175b, a third source electrode 173c, and a third drain electrode 175c is formed.

The first gate electrode 124a, the first source electrode 173a, and the first drain electrode 175a form a first thin film transistor together with the semiconductor 154, and a channel of the thin film transistor is formed at the semiconductor portion 154 between the first source electrode 173a and the first drain electrode 175a. Analogously, the second gate electrode 124b, the second source electrode 173b, and the second drain electrode 175b form a second thin film transistor together with the semiconductor 154, and a channel of the thin film transistor is formed at the semiconductor portion 154 between the second source electrode 173b and the second drain electrode 175b. The third gate electrode 124c, the third source electrode 173c, and the third drain electrode 175c form a third thin film transistor together with the semiconductor 154, and a channel of the thin film transistor is formed at the semiconductor portion 154 between the third source electrode 173c and the third drain electrode 175c.

The data line 171 may have a structure with a narrow width in a thin film transistor formation region around (or near) an extension 175c' of the third drain electrode 175c. This structure is for keeping a distance from the adjacent wiring and reducing signal interference. In one or more embodiments, the structure may not be required.

A first passivation layer 180 is formed on the data conductors 171, 173c, 175a, 175b, and 175c and the exposed semiconductor 154 portion. The first passivation layer 180 may include an inorganic insulator, such as at least one of silicon nitride (SiNx) and silicon oxide (SiOx), or an organic insulator.

A color filter 230 is formed on the first passivation layer 180. The color filter 230 having the same color is formed in adjacent pixels in a vertical direction (i.e., the data line direction). Adjacent pixels in a horizontal direction (i.e., the gate line direction) have color filters 230 and 230' having different colors, and two color filters 230 and 230' may be substantially simultaneously formed and may overlap each other over the data line 171. Each of the color filters 230 and 230' may display one color of a set of primary colors, such as a set of three primary colors of red, green, and blue. In one or more embodiments, each of the color filters 230 and 230' may display one color of cyan, magenta, yellow, and white-based colors.

A first black matrix 220, i.e., a black matrix portion or light-blocking portion overlapping and/or covering a data line, is formed on the color filters 230 and 230' and overlaps at least a portion of each of the color filters 230 and 230'. The first black matrix 220 is made of a non-transmissive material for blocking light. The first black matrix 220 is formed based on a region where the data line 171 is formed to extend in a vertical direction and is not formed in a 'transistor formation region', a region where the gate line 121, the storage voltage line 131, and one or more thin film transistors are formed, such that the first black matrix 220 may not overlap the gate line 121, the storage voltage line 131, or the one or more thin film transistors. A black matrix 225 may overlap the transistor formation region and may block light in the transistor formation region. The second black matrix 225, i.e., a black matrix disposed in a liquid crystal injection hole 335, may be formed after liquid crystal molecules have been injected in a microcavity (e.g., microcavity 305 illustrated in FIG. 5). This will be described below.

A second passivation layer 185 may cover the color filter 230 and the black matrix 220 and may be formed on the color filter 230 and the black matrix 220. The second passivation layer 185 may contain an inorganic insulator, such as at least one of silicon nitride (SiNx) and silicon oxide (SiOx), or an organic insulator. As illustrated in cross-sectional views of FIGS. 2 and 3, in the case where a step occurs due to a thickness difference and/or thickness variation associated with the color filter 230 and/or the black matrix 220, the second passivation layer 185 may reduce or compensate the thickness difference and/or the thickness variation; the second passivation layer 185 may server as a planarization layer disposed over the color filter 230 and the black matrix 220.

A first contact hole 186a and a second contact hole 186b, which expose the first drain electrode 175a and an extension 175b' of the second drain electrode 175b, respectively, are formed in (and/or are formed through) one or more of the color filter 230, the first black matrix 220, and the passivation layers 180 and 185. A third contact hole 186c, which exposes a protrusion 134 of the storage voltage line 131 and the extension 175c' of the third drain electrode 175c, is formed in (and/or is formed through) on or more of the color filter 230, the first black matrix 220, and the passivation layers 180 and 185.

In one or more embodiments, the contact holes 186a, 186b, and 186c are formed in (and/or are formed through) the first black matrix 220 and the color filter 230, even if etching the first black matrix 220 and the color filter 230 may be more difficult than etching the passivation layers 180 and 185 because of material properties. In one or more embodiments, the material used for forming the first black matrix 220 or the color filter 230 may not be formed at positions corresponding to the contact holes 186a, 186b, and 186c before etching of the black matrix 220 or the color filter 230.

In one or more embodiments, the color filter 230 and the passivation layers 180 and 185 may be etched, and a position of the first black matrix 220 may be changed, in order to form the contact holes 186a, 186b, and 186c.

On the second passivation layer 185, a pixel electrode 192 including the first subpixel electrode 192h and the second subpixel electrode 192l is formed. The pixel electrode 192 may be made of a transparent conductive material, such as ITO or IZO.

The first subpixel electrode 192h and the second subpixel electrode 192l are adjacent to each other in a column direction. Each of the first subpixel electrode 192h and the second subpixel electrode 192l may have an overall quadrangular shape and may include a cross stem structure having a horizontal stem and a vertical stem crossing the horizontal stem. Each of the first subpixel electrode 192h and the second subpixel electrode 192l may be divided into four subregions by the horizontal stem and the vertical stem, and each subregion may include a plurality of minute branches.

The minute branches of the first subpixel electrode 192h and the second subpixel electrode 192l form an angle in a range of approximately 40 to 45 degrees with the gate line 121 or the horizontal stem. The minute branches of two adjacent subregions may be perpendicular to each other. A width of the minute branch may be gradually increased. Distances between the minute branches may be different from each other.

The first subpixel electrode 192h and the second subpixel electrode 192l are physically and electrically connected with the first drain electrode 175a and the second drain electrode 175b through the contact holes 186a and 186b and receive data voltage from the first drain electrode 175a and the second drain electrode 175b.

A connecting member 194 electrically connects the extension 175c' of the third drain electrode 175c and the protrusion 134 of the storage voltage line 131 through the third contact hole 186c. As a result, a part of the data voltage applied to the second drain electrode 175b is divided through the third source electrode 173c, and a magnitude of the voltage applied to the second subpixel electrode 192l may be smaller than a magnitude of the voltage applied to the first subpixel electrode 192h.

An area of the second subpixel electrode 192l may be in a range of 1 to 2 times an area of the first subpixel electrode 192h.

An opening for collecting gas discharged from the color filter 230 and a cover for covering the opening may be formed in the second passivation layer 185. The cover may be formed of the same material as the pixel electrode 192. The opening and the cover may prevent gas discharged from the color filter 230 from being transferred to other elements. In one or more embodiments, the opening and the cover may not be required.

A microcavity 305 (see FIG. 5) is positioned on the second passivation layer 185 and the pixel electrode 192 (and is positioned between the second passivation layer 185 and a common electrode 270), and the liquid crystal layer 3 is formed in the microcavity. An alignment layer (not illustrated) may be formed between the second passivation layer 185 and the liquid crystal layer 3 in order to align the liquid crystal molecules injected in the microcavity 305. The alignment layer may contain at least one of polyamic acid, polysiloxane, and polyimide, which are generally used in a liquid crystal alignment layer.

The liquid crystal layer 3 is formed in the microcavity 305 (and on the alignment layer). The liquid crystal molecules 310 are initially aligned by the alignment layer and the alignment direction is changed according to the applied electric field. A height of the liquid crystal layer 3 corresponds to a height of the microcavity 305. A thickness of the liquid crystal layer 3 may be in a range of 2.0 μm to 3.6 μm.

The liquid crystal material for forming the liquid crystal layer 3 may be injected into the microcavity 305 using capillary force in a liquid crystal injection hole 335. The alignment layer may be formed using capillary force.

The common electrode 270 is positioned above the microcavity 305 and the liquid crystal layer 3 with the microcavity 305 and the liquid crystal layer 3 being disposed between the common electrode 270 and the second passivation layer 185. The common electrode 270 may have a curved structure including a protrusion portion (illustrated in FIG. 2) that is disposed above a data line 171 and protrudes (and is convex) toward the data line 171. At least a portion of the first black matrix 220 may be disposed between the protrusion portion and the data line 171. The protrusion portion may directly contact the second passivation layer 185. A portion of the roof material 312 and a portion of the lower insulating layer 311 may be disposed inside a recess structure of the protrusion portion. The common electrode 270 is not formed in the liquid crystal injection hole 335 portion (which corresponds to the transistor formation region); the liquid crystal injection hole 335 may be disposed between two portions of the common electrode 270, as illustrated in FIG. 3. The common electrode 270 may extend in a gate line direction (i.e., the horizontal direction).

The common electrode 270 is made of a transparent conductive material, such as ITO or IZO, and serves to generate an electric field together with the pixel electrode 192 to control an alignment direction of the liquid crystal molecules.

A lower insulating layer 311 is positioned on the common electrode 270. The lower insulating layer 311 may contain an inorganic insulating material, such as silicon nitride (SiNx).

A roof layer 312 is formed on the lower insulating layer 311. The roof layer 312 may serve to support a space (microcavity 305) to be formed between the pixel electrode 192 and the common electrode 270. The roof layer 312 according to one or more embodiments serves to support the microcavity 305 above the common electrode 270 at a predetermined thickness.

An upper insulating layer 313 is formed on the roof layer 312. The upper insulating layer 313 may contain an inorganic insulating material, such as silicon nitride (SiNx).

The liquid crystal injection hole 335 may be formed through the lower insulating layer 311, the roof layer 312, and the upper insulating layer 313 in the transistor formation region, wherein a liquid crystal may be injected through the liquid crystal injection hole 335 into the microcavity 305. The liquid crystal injection hole 335 may be used for removing the sacrificial layer 300 of FIG. 4 in the process of forming the microcavity 305.

The lower insulating layer 311 and the upper insulating layer 313 may be laminated with portions disposed in the transistor formation region corresponding to a position for forming the liquid crystal injection hole 335. In one or more embodiments, the roof layer 312 may not be formed in the transistor formation region; therefore, the liquid crystal injection hole 335 may be formed by removing portions of the lower insulating layer 311 and upper insulating layer 313 in the transistor formation region without removing portions of the roof layer 312. The sacrificial layer 300 may be exposed through the liquid crystal injection hole 335 after a portion of the common electrode 270 that is positioned in the transistor formation region has been removed.

In one or more embodiments, the roof layer 312, the upper insulating layer 313, and the lower insulating layer 311 are etched in a same etching process in the transistor formation region to form the liquid crystal injection hole 335.

In one or more embodiments, the lower insulating layer 311 and the upper insulating layer 313 may not be required.

A second black matrix 225, i.e., a black matrix portion or light-blocking portion for covering the transistor formation region, is formed in the transistor formation region and is formed inside the liquid crystal injection hole 335. The second black matrix 225 is formed of a non-transmissive material for blocking light. In one or more embodiments of the present invention, the second black matrix 225 is formed by injecting the material using an inkjet method. In one or more embodiments, at least a portion of the second black matrix 225 is positioned inside the liquid crystal injection hole 335. In one or more embodiments, a part of the second black matrix 225 may be positioned outside the liquid crystal injection hole 335. Since the second black matrix 225 covers the transistor formation region, light passing through the transistor formation region is blocked, and thus the transistor formation region is not recognized by a viewer of the liquid crystal display. The second black matrix 225 may seal (and/or cap) the liquid crystal injection hole 335 so that the liquid crystal layer 3 may not leak through the liquid crystal injection hole 335 after the liquid crystal layer 3 has been injected through the liquid crystal injection hole 335 into the microcavity 305.

In one or more embodiments, as illustrated in FIG. 3, a portion of the liquid crystal layer 3 may be disposed between the second passivation layer 185 and the second black matrix 225. In one or more embodiments, the second black matrix 225 may directly contact the second passivation layer 185 and thus may separate a first portion of the liquid crystal layer 3 from a second portion of the liquid crystal layer 3.

The second black matrix 225 extends in a horizontal direction along the transistor formation region.

As illustrated in the plan view of FIG. 1, the first black matrix 220 (which include portions extending in the vertical direction) and the second black matrix 225 (which include portions extending in the horizontal direction) may form a lattice structure having openings. A substantial portion of the pixel electrode 192, a substantial portion of the color filter 230, and a substantial portion of the liquid crystal layer 3 may be positioned at one or more corresponding openings.

A lower polarizer (not illustrated) may be positioned below the insulation substrate 110, and an upper polarizer may be positioned above the upper insulating layer 313. Each of the polarizers may include a polarized element for generating polarization and a tri-acetyl-cellulose (TAC) layer for ensuring durability. In one or more embodiments, directions in transmissive axes of the upper polarizer and the lower polarizer may be vertical or parallel to each other.

A process for forming the microcavity 305 and for injecting and capping the liquid crystal layer 3 is described with reference to FIGS. 4 to 6.

Figure 4:
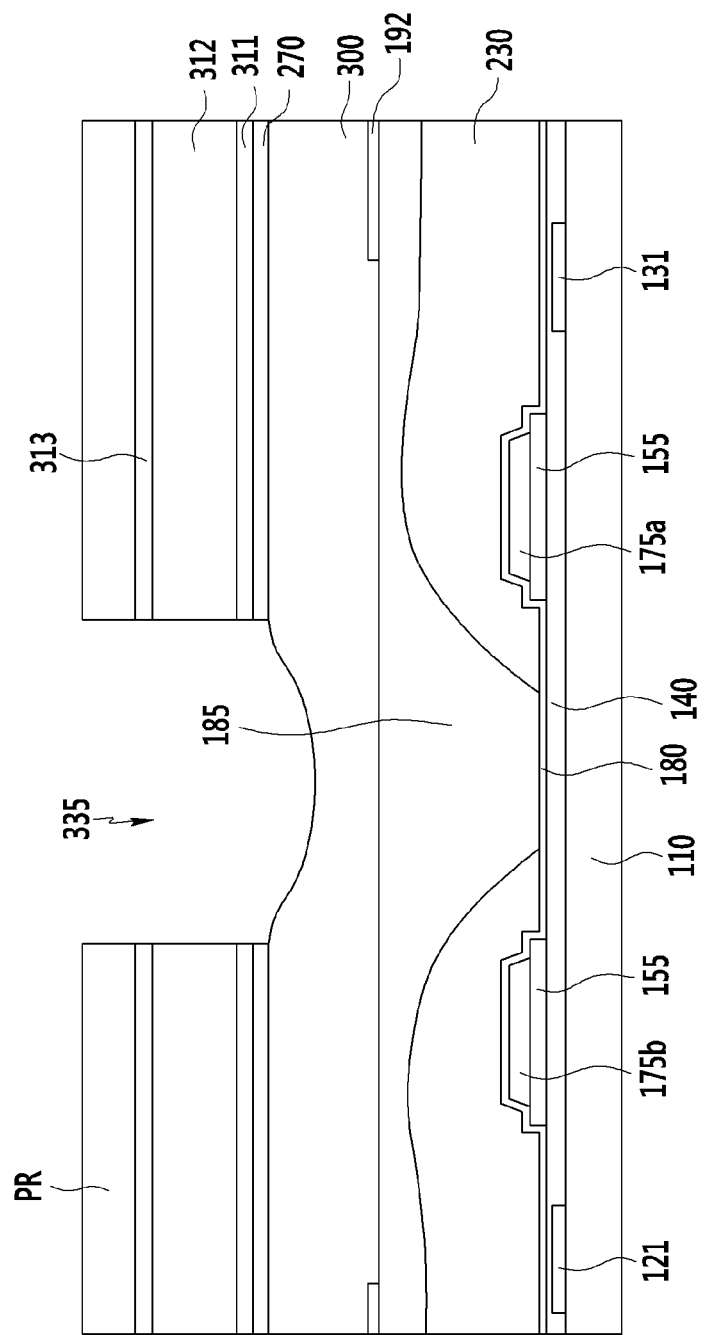
FIGS. 4, 5, and 6 are diagrams sequentially illustrating a manufacturing method of the liquid crystal display of FIG. 1 according to one or more embodiments of the present invention.
Figure 5:
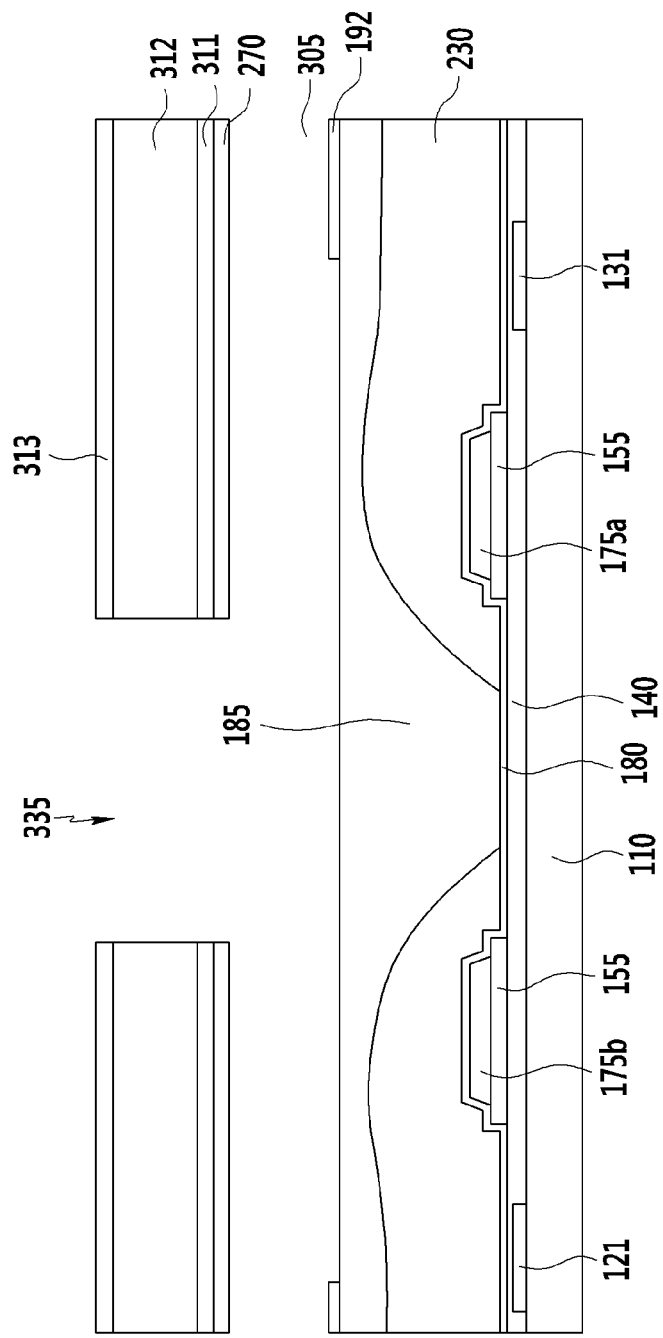
Figure 6:
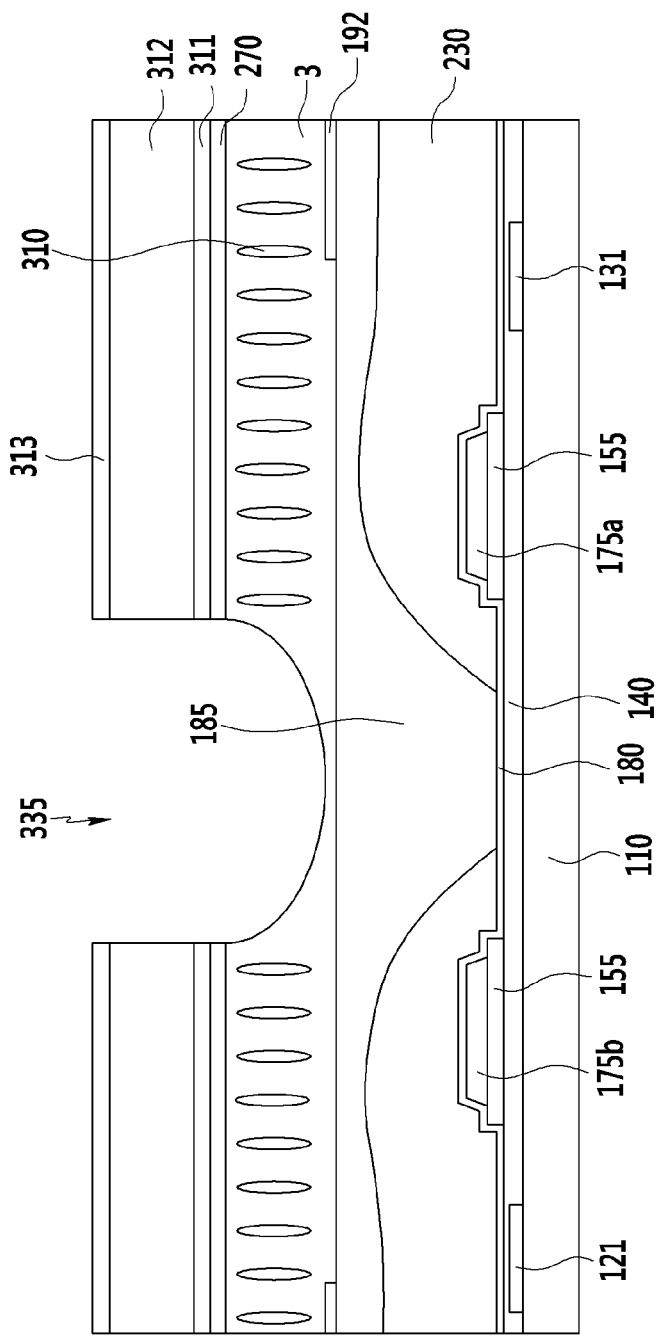

FIGS. 4 to 6 are diagrams sequentially illustrating a manufacturing method of the liquid crystal display of FIG. 1 according to one or more embodiments of the present invention.

FIG. 4 illustrates that the liquid crystal injection hole 335 is formed to expose the microcavity 305. Steps preceding the formation of the liquid crystal injection hole 335 are described below with reference to FIGS. 1 to 3.

The gate line 121 and the storage voltage line 131 are formed on the insulation substrate 110 made of transparent glass, transparent plastic, or a different transparent substrate material. The gate line 121 and the storage voltage line 131 may be substantially simultaneously formed of the same material using the same mask. The gate line 121 includes a first gate electrode 124a, a second gate electrode 124b, and a third gate electrode 124c. The storage voltage line 131 includes storage electrodes 135a and 135b and a protrusion 134 protruding in the gate line 121 direction. The storage electrodes 135a and 135b have a structure surrounding a first subpixel electrode 192h and a second subpixel electrode 192l of a front pixel. Since a gate voltage is to be applied to the gate line 121 and a storage voltage is to be applied to the storage voltage line 131, the gate line 121 and the storage voltage line 131 are electrically insulated from each other. The storage voltage may have a constant voltage level or may have a swing (or variable) voltage level.

A gate insulating layer 140 covering the gate line 121 and the storage voltage line 131 is formed on the gate line 121 and the storage voltage line 131.

Thereafter, the semiconductors 151, 154, and 155, the data line 171, the source electrodes 173a, 173b, and 173c, and the drain electrodes 175a, 175b, and 175c are formed on the gate insulating layer 140.

The semiconductors 151, 154, and 155, the data line 171, and the source electrodes and drain electrodes may be formed by separate processes or substantially simultaneously formed using one mask. In one or more embodiments, for forming the semiconductors 151, 154, and 155, the data line 171, and the source electrodes and drain electrodes using a same mask, materials for forming the semiconductors and material for forming the data line, the source electrodes, and the drain electrodes are sequentially laminated. Thereafter, two patterns are substantially simultaneously formed through one process of exposure, developing, and etching using one mask (e.g., a slit mask or a transflective mask). In one or more embodiments, in order to prevent the semiconductor 154 positioned at the channel part of the thin film transistor from being etched, the corresponding portion is exposed through the slit or transflective region of the mask.

A plurality of ohmic contacts may be formed on the semiconductors 151, 154, and 155 and between the data line 171 and the source electrodes and/or the drain electrodes.

The first passivation layer 180 is formed all over the data conductors 171, 173a, 173b, 173c, 175a, 175b, and 175c and the exposed semiconductor 154 portion. The first passivation layer 180 may contain an inorganic insulator, such as at least one of silicon nitride (SiNx) and silicon oxide (SiOx), or an organic insulator.

Thereafter, the color filter 230 and the first black matrix 220 are formed on the first passivation layer 180. The color filter 230 is formed before the first black matrix 220 is formed. The color filter 230 for each color may be formed by a separate process. Portions of the color filter 230 that correspond to the positions of the contact holes 186a, 186b, and 186c may be removed during etching of the color filter 230.

The first black matrix 220 is formed on the color filter 230 and is formed of a non-transmissive material for blocking light. The first black matrix 220 may extend in a vertical direction and may overlap the data line 171 without overlapping the transistor formation region.

Thereafter, the second passivation layer 185 is formed all over the color filter 230 and the black matrix 220. The second passivation layer 185 may contain an inorganic insulator, such as at least one of silicon nitride (SiNx) and silicon oxide (SiOx), or an organic insulator.

Thereafter, a first contact hole 186a and a second contact hole 186b exposing the first drain electrode 175a and the extension 175b' of the second drain electrode 175b, respectively, are formed in (and/or are formed through) the color filter 230, the black matrix 220, and the passivation layers 180 and 185. Further, in (and/or through) the color filter 230, the black matrix 220, and the passivation layers 180 and 185, the third contact hole 186c exposing the protrusion 134 of the storage voltage line 131 and the extension 175c' of the third drain electrode 175c is formed.

Thereafter, the pixel electrode 192 including the first subpixel electrode 192h and the second subpixel electrode 192l is formed on the second passivation layer 185. The pixel electrode 192 may be made of a transparent conductive material, such as ITO or IZO. The first subpixel electrode 192h and the second subpixel electrode 192l are physically and electrically connected with the first drain electrode 175a and the second drain electrode 175b through the contact holes 186a and 186b, respectively. The connecting member 194 that electrically connects the extension 175c' of the third drain electrode 175c and the protrusion 134 of the storage voltage line 131 through the third contact hole 186c is formed. As a result, a part of the data voltage applied to the second drain electrode 175b is divided through the third source electrode 173c, and a magnitude of the voltage applied to the second subpixel electrode 192l may be smaller than a magnitude of the voltage applied to the first subpixel electrode 192h.

Thereafter, the sacrificial layer 300 (illustrated in FIG. 4) is formed. The sacrificial layer 300 may be made of an organic material, such as a photoresist material. The organic material is exposed, developed, and etched using a mask after the organic material has been laminated on the second passivation layer 185 and the pixel electrode 192, to form the sacrificial layer 300. The sacrificial layer 300 may have an opening above the data line 171 such that the sacrificial layer 300 may not substantially overlap the data line. The sacrificial layer 300 may extend in the data line 171 direction. At the opening, the sacrificial layer 300 may have a tapered side wall analogous to the tapered side wall of the liquid crystal layer 3 illustrated in FIG. 2.

Thereafter, the common electrode 270 and the lower insulating layer 311 are sequentially formed on the sacrificial layer 300, the sidewalls of the opening of the sacrificial layer 300, and the exposed portion of the second passivation layer 185 that is exposed at the opening. In one or more embodiments, after a transparent conductive material, such as ITO or IZO, has been laminated throughout the entire panel (on the top surfaces of the sacrificial layer 300, the sidewalls, the exposed portion of the second passivation layer 185, etc.), a lower insulating layer forming material containing an inorganic insulating material, such as silicon nitride (SiNx), is laminated throughout the entire panel. As a result, the lower insulating layer 311 covers the common electrode 270.

Thereafter, the roof layer 312 is formed on the lower insulating layer 311. The roof layer 312 may contain an organic material. The roof layer 312 may not be formed in the transistor formation region, which may correspond to the location for the liquid crystal injection hole 335, i.e., the roof layer 312 may have an opening at the transistor formation region. The lower insulating layer 311 is exposed by the roof layer 312 opening in the transistor formation region. The roof layer 312 is exposed and developed using a mask after a roof layer material (containing an organic material) has been laminated in the entire panel area and after a portion of the roof layer material corresponding to the transistor formation region has been removed. Therefore, the sacrificial layer 300, the common electrode 270, and the lower insulating layer 311, but not the roof layer 312, are formed in the transistor formation region, and the sacrificial layer 300, the common electrode 270, the lower insulating layer 311, and the roof layer 312 are laminated in regions of the panel other than the transistor formation region.

Thereafter, the upper insulating layer 313, which may be formed of the inorganic insulating material, such as silicon nitride (SiNx), may be laminated on the entire display panel. As a result, the upper insulating layer 313 is formed on the roof layer 312 and formed on the exposed lower insulating layer 311 in the transistor formation region.

Thereafter, a photoresist pattern PR having an opening in the transistor formation region is formed on the upper insulating layer 313. The upper insulating layer 313, the lower insulating layer 311, and the common electrode 270 are etched using the photoresist pattern PR as a mask. As a result, the sacrificial layer 300 is exposed by the liquid crystal injection hole 335, as illustrated in FIG. 4. The etching process for forming the liquid crystal injection hole 335 may be performed through dry etching and/or wet etching.

Thereafter, as illustrated in FIG. 5, the sacrificial layer 300 exposed through the liquid crystal injection hole 335 is removed to form the microcavity 305. In one or more embodiments, the sacrificial layer 300 is made of the photoresist material used for forming the photoresist pattern PR, and the process of removing the photoresist pattern PR formed on the upper insulating layer 313 may be performed when removing the sacrificial layer 300. That is, the photoresist pattern PR formed on the upper insulating layer 313 and the sacrificial layer 300 may be substantially simultaneously wet-etched and removed by immersing the structure illustrated in FIG. 4 in an etchant (for example, a photo resist stripper). Advantageously, the manufacturing process may be substantially shortened and simplified. In one or more embodiments, the sacrificial layer 300 may be formed of a material that is different from the material of the photoresist pattern PR, and two separate process steps may be performed for removing the sacrificial layer 300 and the photo resist pattern PR. In one or more embodiments, the sacrificial layer 300 may be removed through dry etching, alternative or in addition to wet etching.

Thereafter, an alignment layer (not illustrated) and/or the liquid crystal layer 3 (illustrated in FIG. 6) are injected in the microcavity 305 using capillary force. As illustrated in FIG. 5, the microcavity 305 and the liquid crystal injection hole 335 are connected without obstacles. The black matrix to be positioned in the transistor formation region is not formed before the injection of the liquid crystal, and thus the liquid crystal injection may be substantially easy and efficient.

After the liquid crystal material for forming the liquid crystal layer 3 has been injected into the microcavity 305, a capping process for preventing the liquid crystal layer 3 from flowing out through the liquid crystal injection hole 335 is performed. In one or more embodiments, as illustrated in FIG. 3, the second black matrix 225 is formed in the liquid crystal injection hole 335 to prevent transmission of light in the transistor formation region and to cap (and/or seal) the liquid crystal layer 3 so as to prevent leakage of liquid crystal of the liquid crystal layer 3.

The second black matrix 225 is formed of a non-transmissive material in the transistor formation region and in the liquid crystal injection hole 335. In one or more embodiments of the present invention, the second black matrix 225 is formed by injecting the non-transmissive material using an inkjet method. At least a portion of the second black matrix 225 is positioned in the liquid crystal injection hole 335. According to one or more embodiments, a part of the second black matrix 225 may be positioned outside the liquid crystal injection hole 335. Since the second black matrix 225 covers the transistor formation region, light passing through the transistor formation region is blocked, and thus the transistor formation region is not recognized by a viewer of the liquid crystal display. The second black matrix 225 may also seal the liquid crystal layer 3 so as to prevent the liquid crystal layer 3 from leaking through the liquid crystal injection hole 335 after the liquid crystal layer 3 has been injected through the liquid crystal injection hole 335 into the microcavity 305. The second black matrix 225 extends in a horizontal direction along the transistor formation region.

As illustrated in the plan view of FIG. 1, the first black matrix 220 (which include portions extending in the vertical direction) and the second black matrix 225 (which include portions extending in the horizontal direction) may form a lattice structure having openings. A substantial portion of the pixel electrode 192, a substantial portion of the color filter 230, and a substantial portion of the liquid crystal layer 3 may be positioned at one or more corresponding openings.

According to one or more embodiments, the lower insulating layer 311 and the upper insulating layer 313 may not be required.

A lower polarizer (not illustrated) may be disposed below the insulation substrate 110, and an upper polarizer may be disposed above the upper insulating layer 313. Each of the polarizers may include a polarized element for generating polarization and a tri-acetyl-cellulose (TAC) layer for ensuring durability. In one or more embodiments, directions in transmissive axes of the upper polarizer and the lower polarizer may be vertical or parallel to each other.

As can be appreciated from the foregoing discussion, the second black matrix 225 is formed after the liquid crystal layer 3 has been injected into the microcavity 305. Therefore, the second black matrix 225 may not block the injection of liquid crystal for forming the liquid crystal layer 3. Advantageously, the liquid crystal layer 3 may be substantially easily and efficiently formed.

In one or more embodiments, the second black matrix 225 seals the liquid crystal layer 3 to serve as a capping layer so as to prevent the liquid crystal layer 3 from leaking through the liquid crystal injection hole 335.

In one or more embodiments, an additional or alternative capping layer may be formed, as illustrated in FIGS. 7 to 11.

Figure 7:
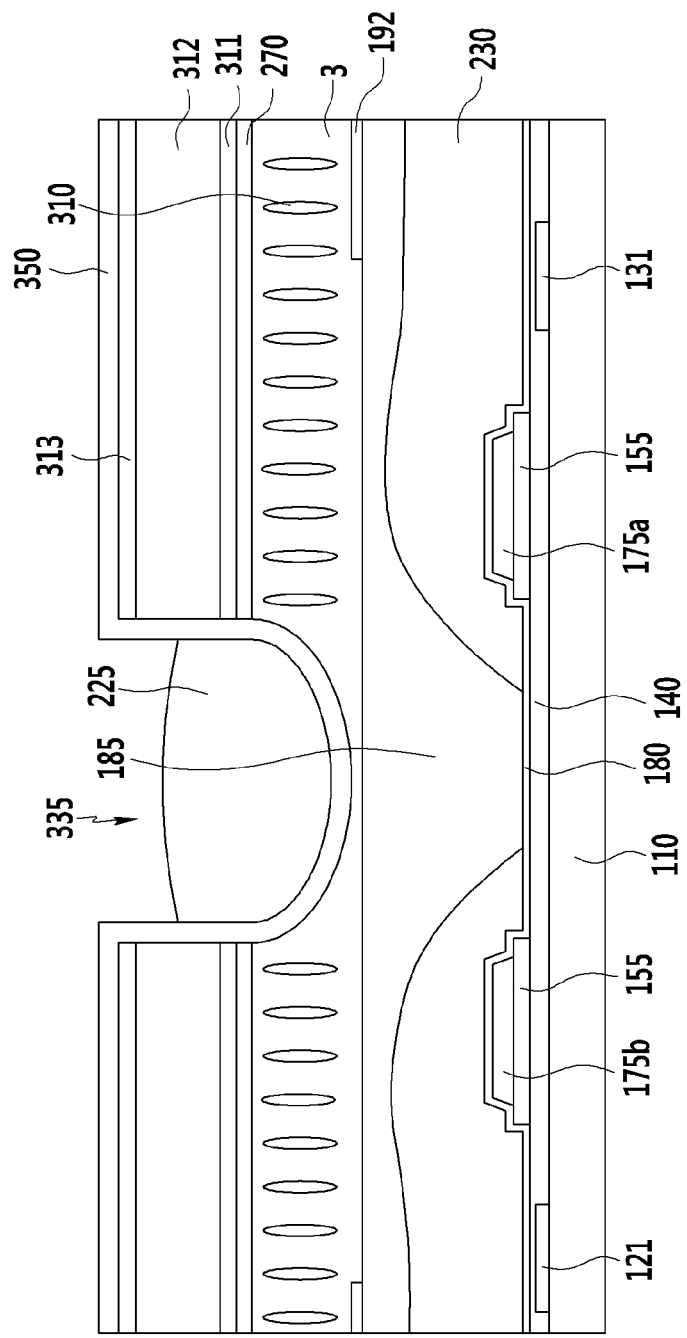
FIG. 7 is a cross-sectional view illustrating a liquid crystal display according to one or more embodiments of the present invention.

FIG. 7 is a cross-sectional view illustrating a liquid crystal display, e.g., the liquid crystal display of FIG. 1, according to one or more embodiments of the present invention. For example, FIG. 7 may be a cross-sectional view taken line III-III indicated in FIG. 1. The liquid crystal display may include a capping layer 350.

Referring to FIG. 1, In the liquid crystal display, a gate line 121 and a storage voltage line 131 are formed on an insulation substrate 110 made of transparent glass, transparent plastic, or a different transparent substrate material. The gate line 121 includes a first gate electrode 124a, a second gate electrode 124b, and a third gate electrode 124c. The storage voltage line 131 includes storage electrodes 135a and 135b and a protrusion 134 protruding in the gate line 121 direction (i.e., the horizontal direction). The storage electrodes 135a and 135b may form a structure that surrounds a first subpixel electrode 192h and a second subpixel electrode 192l of a front pixel. A horizontal portion of the storage electrode 135b may be one wiring which is not separated from the horizontal portion of the front pixel.

A gate insulating layer 140 is formed on the gate line 121 and the storage voltage line 131. A semiconductor 151 positioned below a data line 171, portions of a semiconductor 155 positioned below one or more drain electrodes (e.g., a drain electrode 175b), and a semiconductor 154 positioned at a channel part of a thin film transistor are formed on the gate insulating layer 140.

A plurality of ohmic contacts may be respectively formed on the semiconductors 151, 154, and 155 and between the data line 171 and the one or more source electrodes and/or the one or more drain electrodes, is the ohmic contacts being omitted in the drawings.

On the semiconductors 151, 154, and 155 and the gate insulating layer 140, a set of data conductors that includes a plurality of data lines 171 including a first source electrode 173a and a second source electrode 173b, a first drain electrode 175a, a second drain electrode 175b, a third source electrode 173c, and a third drain electrode 175c is formed.

The first gate electrode 124a, the first source electrode 173a, and the first drain electrode 175a form a first thin film transistor together with the semiconductor 154, and a channel of the thin film transistor is formed at the semiconductor portion 154 between the first source electrode 173a and the first drain electrode 175a. Analogously, the second gate electrode 124b, the second source electrode 173b, and the second drain electrode 175b form a second thin film transistor together with the semiconductor 154, and a channel of the thin film transistor is formed at the semiconductor portion 154 between the second source electrode 173b and the second drain electrode 175b. The third gate electrode 124c, the third source electrode 173c, and the third drain electrode 175c form a third thin film transistor together with the semiconductor 154, and a channel of the thin film transistor is formed at the semiconductor portion 154 between the third source electrode 173c and the third drain electrode 175c.

The data line 171 of may have a structure with a narrow width in a thin film transistor formation region around (or near) an extension 175c' of the third drain electrode 175c. This structure is for keeping a distance from the adjacent wiring and reducing signal interference. In one or more embodiments, the structure may not be required.

A first passivation layer 180 is formed on the data conductors 171, 173c, 175a, 175b, and 175c and the exposed semiconductor 154 portion. The first passivation layer 180 may include an inorganic insulator, such as at least one of silicon nitride (SiNx) and silicon oxide (SiOx), or an organic insulator.

A color filter 230 is formed on the first passivation layer 180. The color filter 230 having the same color is formed in adjacent pixels in a vertical direction (i.e., the data line direction). Adjacent pixels in a horizontal direction (i.e., the gate line direction) have color filters 230 and 230' having different colors, and two color filters 230 and 230' may be substantially simultaneously formed and may overlap each other over the data line 171. Each of the color filters 230 and 230' may display one color of a set of primary colors such as three primary colors of red, green, and blue. In one or more embodiments, each of the color filters 230 and 230' may display one color of cyan, magenta, yellow, and white-based colors.

A first black matrix 220, i.e., a black matrix portion overlapping and/or covering a data line, is formed on the color filters 230 and 230' and overlaps at least a portion of each of the color filters 230 and 230'. The first black matrix 220 is made of a non-transmissive material for blocking light. The first black matrix 220 is formed based on a region where the data line 171 is formed to extend in a vertical direction and is not formed in a 'transistor formation region', a region where the gate line 121, the storage voltage line 131, and one or more thin film transistors are formed, such that the first black matrix 220 may not overlap the gate line 121, the storage voltage line 131, or the one or more thin film transistors. A black matrix 225 may overlap the transistor formation region and may block light in the transistor formation region. The second black matrix 225, i.e., a black matrix disposed in a liquid crystal injection hole 335, may be formed after liquid crystal molecules have been injected in a microcavity (e.g., microcavity 305 illustrated in FIG. 5). This will be described below.

A second passivation layer 185 may cover the color filter 230 and the black matrix 220 and may be formed on the color filter 230 and the black matrix 220. The second passivation layer 185 may contain an inorganic insulator, such as at least one of silicon nitride (SiNx) and silicon oxide (SiOx), or an organic insulator. As illustrated in cross-sectional views of FIGS. 2 and 3, in the case where a step occurs due to a thickness difference and/or thickness variation associated with the color filter 230 and/or the black matrix 220, the second passivation layer 185 may reduce or compensate the thickness difference and/or the thickness variation; the second passivation layer 185 may server as a planarization layer disposed over the color filter 230 and the black matrix 220.

A first contact hole 186a and a second contact hole 186b which expose the first drain electrode 175a and an extension 175b' of the second drain electrode 175b, respectively, are formed in (and/or are formed through) one or more of the color filter 230, the first black matrix 220, and the passivation layers 180 and 185. A third contact hole 186c, which exposes a protrusion 134 of the storage voltage line 131 and the extension 175c' of the third drain electrode 175c is formed in (and/or is formed through) on or more of the color filter 230, the first black matrix 220, and the passivation layers 180 and 185.

In one or more embodiments, the contact holes 186a, 186b, and 186c are formed in (and/or are formed through) the first black matrix 220 and the color filter 230, even if etching the first black matrix 220 and the color filter 230 may be more difficult than etching the passivation layers 180 and 185 because of material properties. In one or more embodiments, the material used for forming the first black matrix 220 or the color filter 230 may not be formed at positions corresponding to the contact holes 186a, 186b, and 186c before etching of the black matrix 220 or the color filter 230.

In one or more embodiments, the color filter 230 and the passivation layers 180 and 185 may be etched, and a position of the first black matrix 220 may be changed, in order to form the contact holes 186a, 186b, and 186c.

On the second passivation layer 185, a pixel electrode 192 including the first subpixel electrode 192h and the second subpixel electrode 192l is formed. The pixel electrode 192 may be made of a transparent conductive material such as ITO or IZO.

The first subpixel electrode 192h and the second subpixel electrode 192l are adjacent to each other in a column direction. Each of the first subpixel electrode 192h and the second subpixel electrode 192*l* may have an overall quadrangular shape, and include a cross stem configured by a horizontal stem and a vertical stem crossing the horizontal stem. Each of the first subpixel electrode 192*h* and the second subpixel electrode 192*l* may be divided into four subregions by the horizontal stem and the vertical stem, and each subregion may include a plurality of minute branches.

The minute branches of the first subpixel electrode 192*h* and the second subpixel electrode 192*l* form an angle in a range of approximately 40 to 45 degrees with the gate line 121 or the horizontal stem. The minute branches of two adjacent subregions may be perpendicular to each other. A width of the minute branch may be gradually increased. Distances between the minute branches may be different from each other.

The first subpixel electrode 192*h* and the second subpixel electrode 192*l* are physically and electrically connected with the first drain electrode 175*a* and the second drain electrode 175*b* through the contact holes 186*a* and 186*b* and receive data voltage from the first drain electrode 175*a* and the second drain electrode 175*b*.

A connecting member 194 electrically connects the extension 175*c'* of the third drain electrode 175*c* and the protrusion 134 of the storage voltage line 131 through the third contact hole 186*c*. As a result, a part of the data voltage applied to the second drain electrode 175*b* is divided through the third source electrode 173*c*, and a magnitude of the voltage applied to the second subpixel electrode 192*l* may be smaller than a magnitude of the voltage applied to the first subpixel electrode 192*h*.

An area of the second subpixel electrode 192*l* may be in a range of 1 to 2 times an area of the first subpixel electrode 192*h*.

An opening for collecting gas discharged from the color filter 230 and a cover for covering the opening may be formed in the second passivation layer 185. The cover may be formed of the same material as the pixel electrode 192. The opening and the cover may prevent gas discharged from the color filter 230 from being transferred to other elements. In one or more embodiments, the opening and the cover may not be required.

A microcavity 305 is positioned on the second passivation layer 185 and the pixel electrode 192 (and is positioned between the second passivation layer 185 and a common electrode 270), and the liquid crystal layer 3 is formed in the microcavity. An alignment layer (not illustrated) may be formed between the second passivation layer 185 and the liquid crystal layer 3 in order to align the liquid crystal molecules injected in the microcavity 305. The alignment layer may contain at least one of polyamic acid, polysiloxane, and polyimide, which are generally used in a liquid crystal alignment layer.

The liquid crystal layer 3 is formed in the microcavity 305 (and on the alignment layer). The liquid crystal molecules 310 are initially aligned by the alignment layer and the alignment direction is changed according to the applied electric field. A height of the liquid crystal layer 3 corresponds to a height of the microcavity 305. A thickness of the liquid crystal layer 3 may be in a range of 2.0 µm to 3.6 µm.

Liquid crystal material for forming the liquid crystal layer 3 may be injected into the microcavity 305 using capillary force in a liquid crystal injection hole 335. The alignment layer may be formed capillary force.

The common electrode 270 is positioned above the microcavity 305 and the liquid crystal layer 3 with the microcavity 305 and the liquid crystal layer 3 being disposed between the common electrode 270 and the second passivation layer 185. The common electrode 270 may have a curved structure including a protrusion portion (illustrated in FIG. 2) that is disposed above a data line 171 and protrudes (and is convex) toward the data line 171. At least a portion of the first black matrix 220 may be disposed between the protrusion portion and the data line 171. The protrusion portion may directly contact the second passivation layer 185. A portion of the roof material 312 and a portion of the lower insulating layer 311 may be disposed inside a recess structure of the protrusion portion. The common electrode 270 is not formed in the liquid crystal injection hole 335 portion (which corresponds to the transistor formation region); the liquid crystal injection hole 335 may be disposed between two portions of the common electrode 270, as illustrated in FIG. 3. The common electrode 270 may extend in a gate line direction (i.e., the horizontal direction).

The common electrode 270 is made of a transparent conductive material, such as ITO or IZO, and serves to generate an electric field together with the pixel electrode 192 to control an alignment direction of the liquid crystal molecules.

A lower insulating layer 311 is positioned on the common electrode 270. The lower insulating layer 311 may contain an inorganic insulating material such as silicon nitride (SiNx).

A roof layer 312 is formed on the lower insulating layer 311. The roof layer 312 may serve to support a space (microcavity 305) to be formed between the pixel electrode 192 and the common electrode 270. The roof layer 312 according to one or more embodiments serves to support the microcavity 305 above the common electrode 270 at a predetermined thickness.

An upper insulating layer 313 is formed on the roof layer 312. The upper insulating layer 313 may contain an inorganic insulating material, such as silicon nitride (SiNx).

The liquid crystal injection hole 335 may be formed through the lower insulating layer 311, the roof layer 312, and the upper insulating layer 313 in the transistor formation region, wherein a liquid crystal may be injected through the liquid crystal injection hole 335 into the microcavity 305. The liquid crystal injection hole 335 may be used for removing the sacrificial layer 300 of FIG. 4 in the process of forming the microcavity 305.

The lower insulating layer 311 and the upper insulating layer 313 may be laminated with portions disposed in the transistor formation region corresponding to a position for forming the liquid crystal injection hole 335. In one or more embodiments, the roof layer 312 may not be formed in the transistor formation region; therefore, the liquid crystal injection hole 335 may be formed by removing portions of the lower insulating layer 311 and upper insulating layer 313 in the transistor formation region without removing portions of the roof layer 312. The sacrificial layer 300 may be exposed through the liquid crystal injection hole 335 after a portion of the common electrode 270 that is positioned in the transistor formation region has been removed.

According to one or more embodiments, the roof layer 312, the upper insulating layer 313, and the lower insulating layer 311 are etched in the transistor formation region to form the liquid crystal injection hole 335.

According to one or more embodiments, the lower insulating layer 311 and the upper insulating layer 313 may be omitted.

A capping layer 350 is formed on the liquid crystal injection hole 335 and the upper insulating layer 313. The capping layer 350 is made of a transparent material and may contain an organic insulating material or an inorganic insulating material, such as silicon nitride (SiNx). The capping layer 350, as illustrated in FIG. 7, may be formed throughout the entire display panel. In one or more embodiments, the capping layer 350 may be formed only near the liquid crystal injection hole 335. The capping layer 350 serves to seal the liquid crystal injection hole 335 after the liquid crystal material of the liquid crystal layer 3 has been injected into the microcavity 305 so as to prevent the liquid crystal layer 3 from leaking through the liquid crystal injection hole 335.

In one or more embodiments, as illustrated in FIG. 7, a portion of the liquid crystal layer 3 may be disposed between the second passivation layer 185 and the capping layer 350. In one or more embodiments, the capping layer 350 may directly contact the second passivation layer 185 and thus may separate a first portion of the liquid crystal layer 3 from a second portion of the liquid crystal layer 3.

The second black matrix 225 is formed on the capping layer 350, formed in the transistor formation region, formed in the liquid crystal injection hole 335. At least a portion of the capping layer 350 may be disposed between the second black matrix 225 and the second passivation layer 185 and may be disposed between the second black matrix 225 and a portion of the liquid crystal layer 3. At least a portion of the capping layer 350 (e.g., a portion that is substantially perpendicular to the substrate 110) may be disposed between the second black matrix 225 and at least a portion of one or more of the upper insulating layer 313, the roof layer 312, the lower insulating layer 311, the common electrode 270, and the liquid crystal layer 3. In one or more embodiments of the present invention, the second black matrix 225 is formed by injecting the material using an inkjet method. In one or more embodiments, at least a portion of the second black matrix 225 is positioned inside the liquid crystal injection hole 335. According to one or more embodiments, a part of the second black matrix 225 may be positioned outside the liquid crystal injection hole 335. The second black matrix 225 is formed of a non-transmissive material. Since the second black matrix 225 covers the transistor formation region, light passing through the transistor formation region is blocked, and thus the transistor formation region is not recognized by a viewer of the liquid crystal display. The second black matrix 225 extends in a horizontal direction along the transistor formation region.

As illustrated in the plan view of FIG. 1, the first black matrix 220 (which include portions extending in the vertical direction) and the second black matrix 225 (which include portions extending in the horizontal direction) may form a lattice structure having openings. A substantial portion of the pixel electrode 192, a substantial portion of the color filter 230, and a substantial portion of the liquid crystal layer 3 may be positioned at one or more corresponding openings.

A lower polarizer (not illustrated) may be positioned below the insulation substrate 110, and an upper polarizer may be positioned above the upper insulating layer 313. Each of the polarizers may include a polarized element for generating polarization and a tri-acetyl-cellulose (TAC) layer for ensuring durability. In one or more embodiments, directions in transmissive axes of the upper polarizer and the lower polarizer may be vertical or parallel to each other.

A process for forming the microcavity 305 and for injecting and capping the liquid crystal layer 3 is described with reference to FIGS. 8 to 11.

FIGS. 8 to 11 are diagrams sequentially illustrating a manufacturing method of the liquid crystal display of FIGS. 1 and 7 according to one or more embodiments of the present invention.

Figure 8:
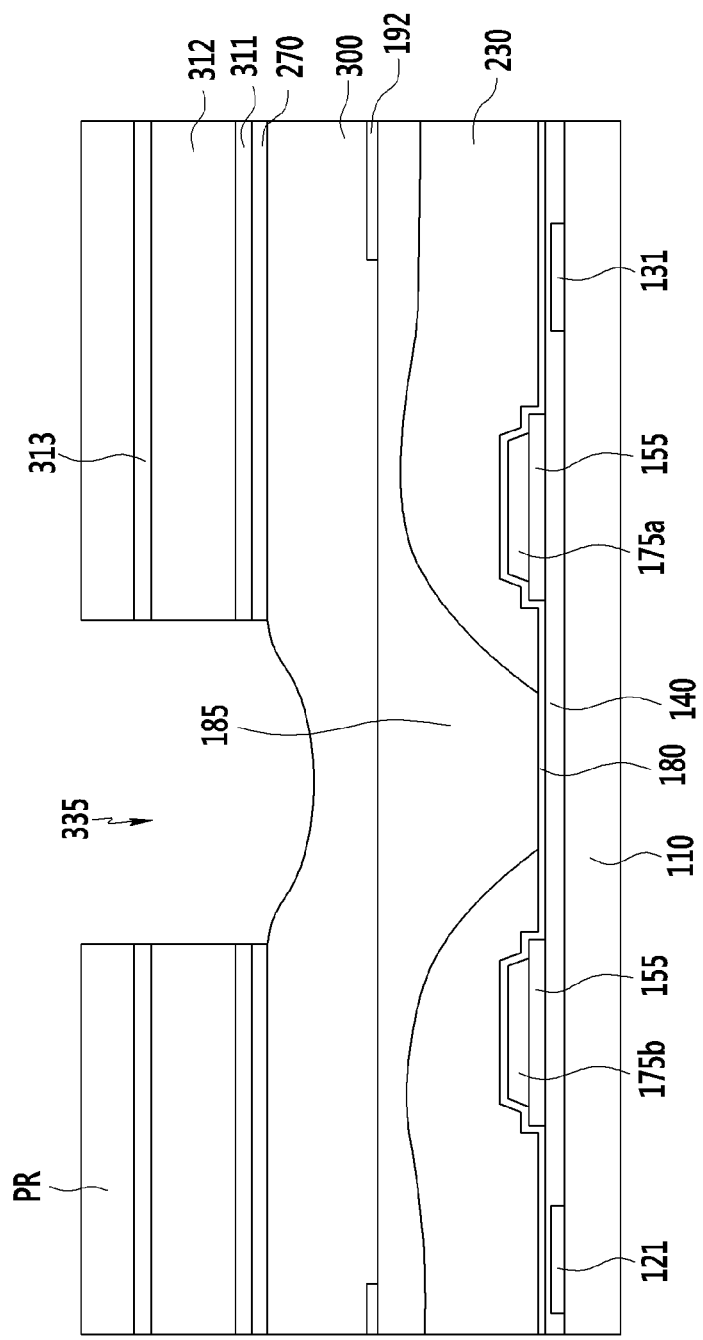
FIGS. 8, 9, 10, and 11 are diagrams sequentially illustrating a manufacturing method of the liquid crystal display of FIG. 7 according to one or more embodiments of the present invention.

FIG. 8 illustrates that the liquid crystal injection hole 335 is formed to expose the microcavity 305. Steps preceding the formation of the liquid crystal injection hole 335 are described below with reference to at least some of FIGS. 1 to 7.

The gate line 121 and the storage voltage line 131 are formed on the insulation substrate 110 made of transparent glass, transparent plastic, or a different transparent substrate material. The gate line 121 and the storage voltage line 131 may be substantially simultaneously formed of the same material using the same mask. The gate line 121 includes a first gate electrode 124a, a second gate electrode 124b, and a third gate electrode 124c. The storage voltage line 131 includes storage electrodes 135a and 135b and a protrusion 134 protruding in the gate line 121 direction. The storage electrodes 135a and 135b have a structure surrounding a first subpixel electrode 192h and a second subpixel electrode 192l of a front pixel. Since a gate voltage is to be applied to the gate line 121 and a storage voltage is to be applied to the storage voltage line 131, the gate line 121 and the storage voltage line 131 are electrically insulated from each other. The storage voltage may have a constant voltage level or may have a swing (or variable) voltage level.

A gate insulating layer 140 covering the gate line 121 and the storage voltage line 131 is formed on the gate line 121 and the storage voltage line 131.

Thereafter, the semiconductors 151, 154, and 155, the data line 171, the source electrodes 173a, 173b, and 173c, and the drain electrodes 175a, 175b, and 175c are formed on the gate insulating layer 140.

The semiconductors 151, 154, and 155, the data line 171, and the source electrodes and drain electrodes may be formed by separate processes or substantially simultaneously formed using one mask. In one or more embodiments, for forming the semiconductors 151, 154, and 155, the data line 171, and the source electrodes and drain electrodes using a same mask, materials for forming the semiconductors and material for forming the data line, the source electrodes, and the drain electrodes are sequentially laminated. Thereafter, two patterns are substantially simultaneously formed through one process of exposure, developing, and etching using one mask (e.g., a slit mask or a transflective mask). In one or more embodiments, in order to prevent the semiconductor 154 positioned at the channel part of the thin film transistor from being etched, the corresponding portion is exposed through the slit or transflective region of the mask.

A plurality of ohmic contacts may be formed on the semiconductors 151, 154, and 155 and between the data line 171 and the source electrodes and/or the drain electrodes.

The first passivation layer 180 is formed all over the data conductors 171, 173a, 173b, 173c, 175a, 175b, and 175c and the exposed semiconductor 154 portion. The first passivation layer 180 may contain an inorganic insulator, such as at least one of silicon nitride (SiNx) and silicon oxide (SiOx), or an organic insulator.

Thereafter, the color filter 230 and the first black matrix 220 are formed on the first passivation layer 180. The color filter 230 is formed before the first black matrix 220 is formed. The color filter 230 for each color may be formed by a separate process. Portions of the color filter 230 that correspond to the positions of the contact holes 186a, 186b, and 186c may be removed during etching of the color filter 230.

The first black matrix 220 is formed on the color filter 230 and is formed of a non-transmissive material for blocking light. The first black matrix 220 may extend in a vertical direction and may overlap the data line 171 without overlapping the transistor formation region.

Thereafter, the second passivation layer 185 is formed all over the color filter 230 and the black matrix 220. The second passivation layer 185 may contain an inorganic insulator, such as at least one of silicon nitride (SiNx) and silicon oxide (SiOx), or an organic insulator.

Thereafter, a first contact hole 186a and a second contact hole 186b exposing the first drain electrode 175a and the extension 175b' of the second drain electrode 175b, respectively are formed in (and/or are formed through) the color filter 230, the black matrix 220, and the passivation layers 180 and 185. Further, in (and/or through) the color filter 230, the black matrix 220, and the passivation layers 180 and 185, the third contact hole 186c exposing the protrusion 134 of the storage voltage line 131 and the extension 175c' of the third drain electrode 175c is formed.

Thereafter, the pixel electrode 192 including the first subpixel electrode 192h and the second subpixel electrode 192l is formed on the second passivation layer 185. The pixel electrode 192 may be made of a transparent conductive material, such as ITO or IZO. The first subpixel electrode 192h and the second subpixel electrode 192l are physically and electrically connected with the first drain electrode 175a and the second drain electrode 175b through the contact holes 186a and 186b, respectively. The connecting member 194 that electrically connects the extension 175c' of the third drain electrode 175c and the protrusion 134 of the storage voltage line 131 through the third contact hole 186c is formed. As a result, a part of the data voltage applied to the second drain electrode 175b is divided through the third source electrode 173c, and a magnitude of the voltage applied to the second subpixel electrode 192l may be smaller than a magnitude of the voltage applied to the first subpixel electrode 192h.

Thereafter, the sacrificial layer 300 (illustrated in FIG. 8) is formed. The sacrificial layer 300 may be made of an organic material, such as a photoresist material. The organic material is exposed, developed, and etched using a mask after the organic material has been laminated on the second passivation layer 185 and the pixel electrode 192, to form the sacrificial layer 300. The sacrificial layer 300 may have an opening above the data line 171 such that the sacrificial layer 300 may not substantially overlap the data line. The sacrificial layer 300 may extend in the data line 171 direction. At the opening, the sacrificial layer 300 may have a tapered side wall analogous to the tapered side wall of the liquid crystal layer 3 illustrated in FIG. 2.

Thereafter, the common electrode 270 and the lower insulating layer 311 are sequentially formed on the sacrificial layer 300, the sidewalls of the opening of the sacrificial layer 300, and the exposed portion of the second passivation layer 185 that is exposed at the opening. In one or more embodiments, after a transparent conductive material, such as ITO or IZO, has been laminated throughout the entire panel (on the top surfaces of the sacrificial layer 300, the sidewalls, the exposed portion of the second passivation layer 185, etc.), a lower insulating layer forming material containing an inorganic insulating material, such as silicon nitride (SiNx), is laminated throughout the entire panel. As a result, the lower insulating layer 311 covers the common electrode 270.

Thereafter, the roof layer 312 is formed on the lower insulating layer 311. The roof layer 312 may contain an organic material. The roof layer 312 may not be formed in the transistor formation region, which may correspond to the location for the liquid crystal injection hole 335, i.e., the roof layer 312 may have an opening at the transistor formation region. The lower insulating layer 311 is exposed by the roof layer 312 opening in the transistor formation region. The roof layer 312 is exposed and developed using a mask after a roof layer material (containing an organic material) has been laminated in the entire panel area and after a portion of the roof layer material corresponding to the transistor formation region has been removed. Therefore, the sacrificial layer 300, the common electrode 270, and the lower insulating layer 311, but not the roof layer 312, are formed in the transistor formation region, and the sacrificial layer 300, the common electrode 270, the lower insulating layer 311, and the roof layer 312 are laminated in regions of the panel other than the transistor formation region.

Thereafter, the upper insulating layer 313, which may be formed of the inorganic insulating material, such as silicon nitride (SiNx), may be laminated on the entire display panel. As a result, the upper insulating layer 313 is formed on the roof layer 312 and formed on the exposed lower insulating layer 311 in the transistor formation region.

Thereafter, a photoresist pattern PR having an opening in the transistor formation region is formed on the upper insulating layer 313. The upper insulating layer 313, the lower insulating layer 311, and the common electrode 270 are etched using the photoresist pattern PR as a mask. As a result, the sacrificial layer 300 is exposed by the liquid crystal injection hole 335, as illustrated in FIG. 8. The etching process for forming the liquid crystal injection hole 335 may be performed through dry etching and/or wet etching.

Figure 9:
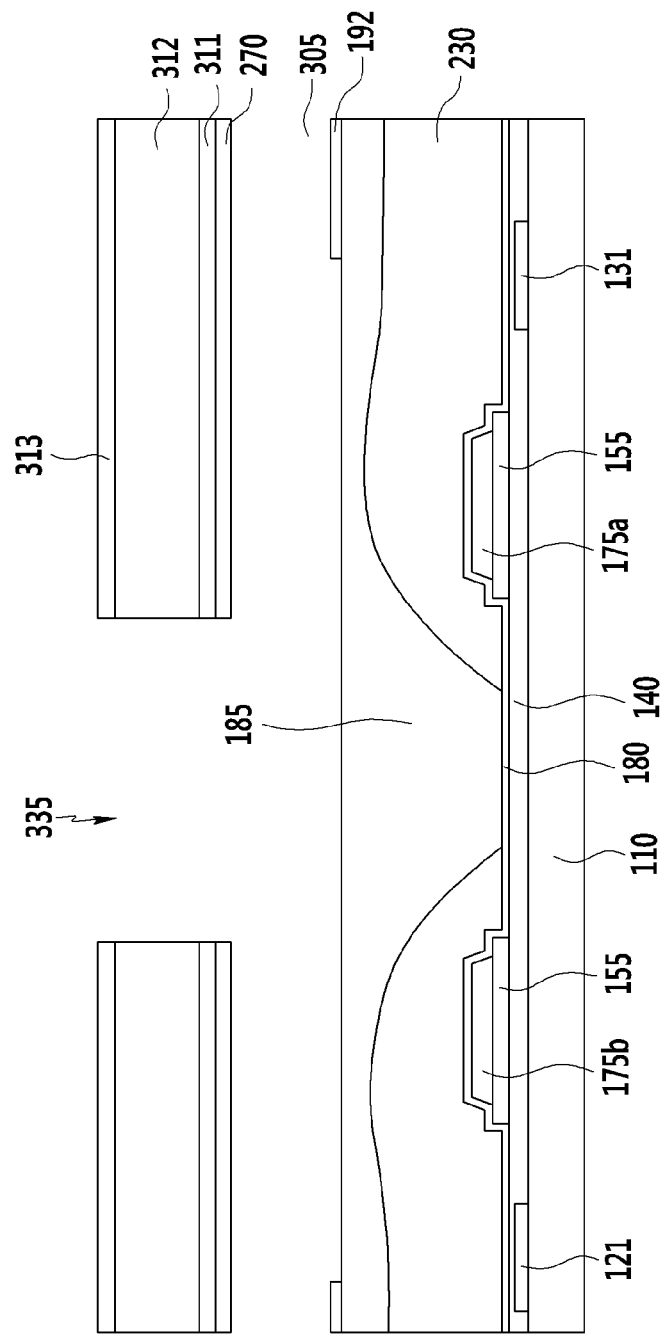
Figure 10:
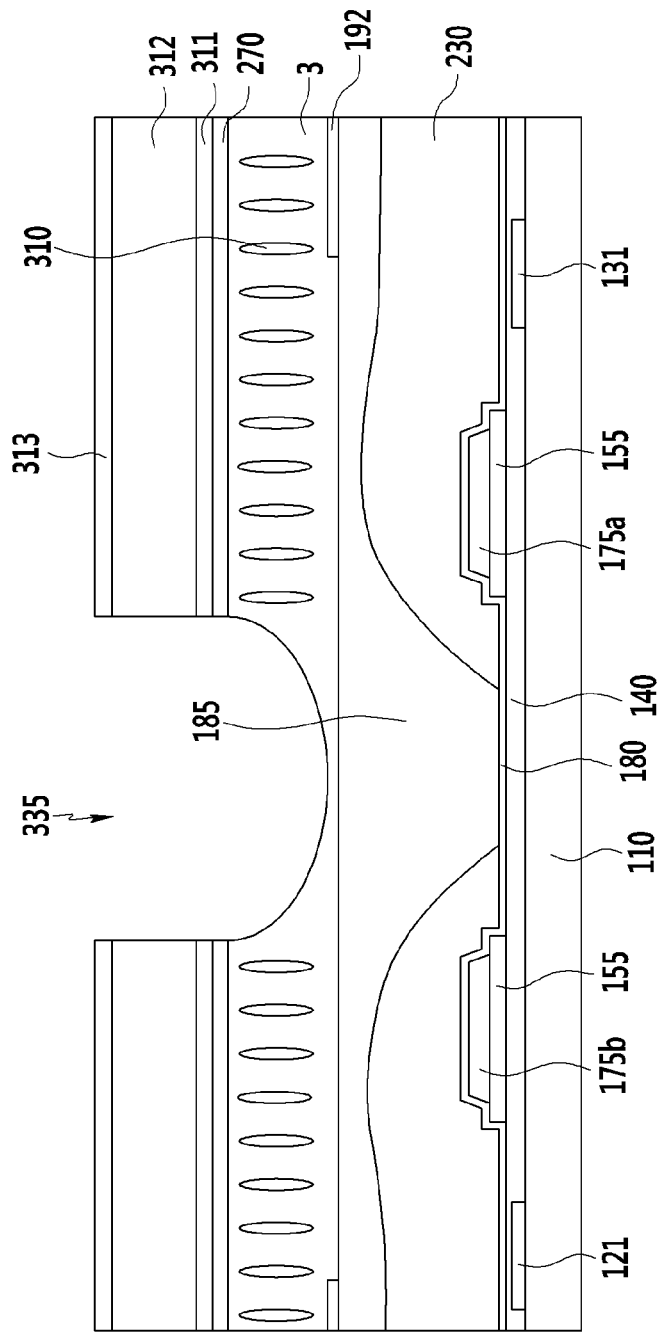
Figure 11:
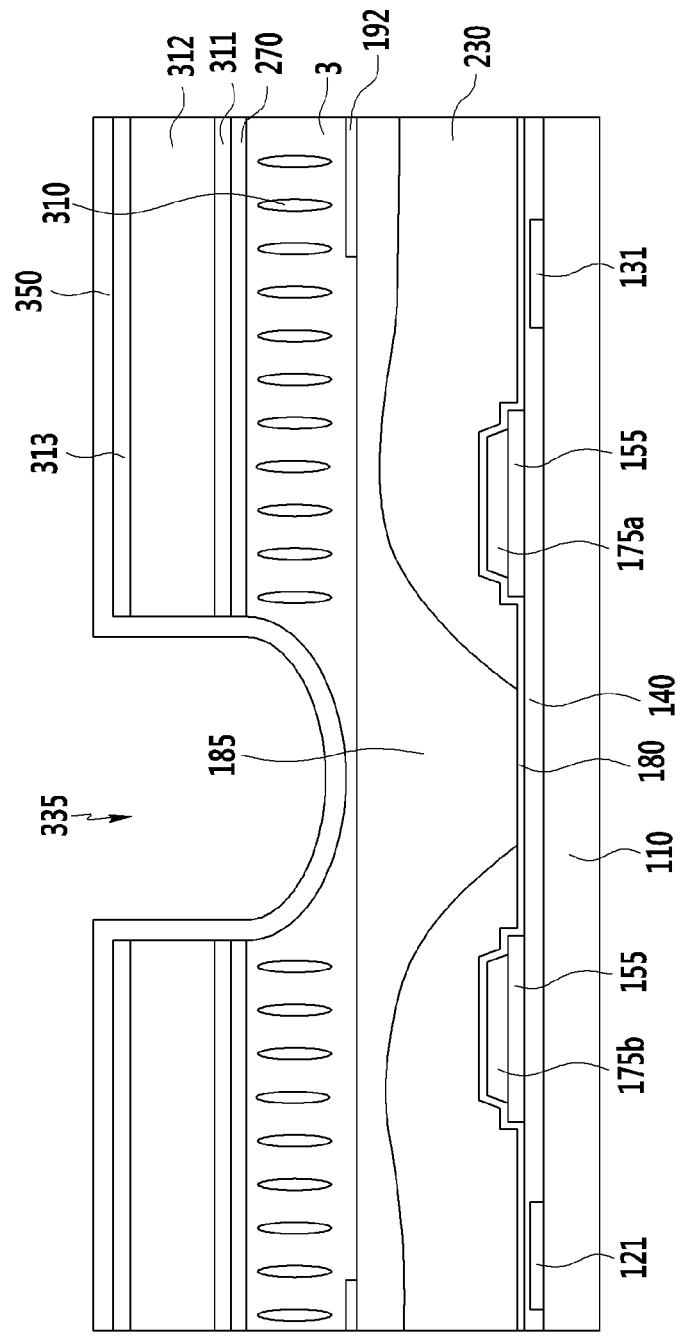

Thereafter, as illustrated in FIG. 9, the sacrificial layer 300 exposed through the liquid crystal injection hole 335 is removed to form the microcavity 305. In one or more embodiments, the sacrificial layer 300 is made of the photoresist material used for forming the photoresist pattern PR, and the process of removing the photoresist pattern PR formed on the upper insulating layer 313 may be performed when removing the sacrificial layer 300. That is, the photoresist pattern PR formed on the upper insulating layer 313 and the sacrificial layer 300 may be substantially simultaneously wet-etched and removed by immersing the structure illustrated in FIG. 4 in an etchant (for example, a photo resist stripper). Advantageously, the manufacturing process may be substantially shortened and simplified. In one or more embodiments, the sacrificial layer 300 may be formed of a material that is different from the material of the photoresist pattern PR, and two separate process steps may be performed for removing the sacrificial layer 300 and the photo resist pattern PR. In one or more embodiments, the sacrificial layer 300 may be removed through dry etching, alternative or in addition to wet etching.

Thereafter, an alignment layer (not illustrated) and/or the liquid crystal layer 3 (illustrated in FIG. 10) are injected in the microcavity 305 using capillary force. As illustrated in FIG. 9, the microcavity 305 and the liquid crystal injection hole 335 are connected without obstacles. The black matrix to be positioned in the transistor formation region is not formed before the injection of the liquid crystal, and thus the liquid crystal injection may be substantially easy and efficient.

After the liquid crystal material for forming the liquid crystal layer 3 has been injected into the microcavity 305, a capping process for preventing the liquid crystal layer 3 from flowing out through the liquid crystal injection hole 335 is performed. In one or more embodiments, as illustrated in FIG. 7, the capping layer 350 is formed to seal the liquid crystal injection hole 335 such that leakage of the liquid crystal layer 3 may be prevented.

The capping layer 350 is formed in the liquid crystal injection hole 335 and is formed on the upper insulating layer 313. The capping layer 350 is made of a transparent material and may contain an organic insulating material or an inorganic insulating material, such as silicon nitride (SiNx). In one or more embodiments, the capping layer 350 is formed throughout the entire display panel. According to one or more embodiments, the capping layer 350 may be formed only near the liquid crystal injection hole 335. The capping layer 350 serves to seal the liquid crystal injection hole 335 after the liquid crystal material of the liquid crystal layer 3 has been injected into the microcavity 305 so as to prevent the liquid crystal layer 3 from leaking through the liquid crystal injection hole 335.

Thereafter, as illustrated in FIG. 7, the second black matrix 225, which is formed of a non-transmissive material, may be formed on the capping layer 350, formed in the transistor formation region, and formed in the liquid crystal injection hole 335. In one or more embodiments of the present invention, the second black matrix 225 is formed by injecting the material using an inkjet method. In one or more embodiments, at least a portion of the second black matrix 225 is positioned inside the liquid crystal injection hole 335. According to one or more embodiments, a part of the second black matrix 225 may be positioned outside the liquid crystal injection hole 335. Since the second black matrix 225 covers the transistor formation region, light passing through the transistor formation region is blocked and thus the transistor formation region is not recognized by a viewer of the liquid crystal display. The second black matrix 225 extends in a horizontal direction along the transistor formation region.

As illustrated in the plan view of FIG. 1, the first black matrix 220 (which include portions extending in the vertical direction) and the second black matrix 225 (which include portions extending in the horizontal direction) may form a lattice structure having openings. A substantial portion of the pixel electrode 192, a substantial portion of the color filter 230, and a substantial portion of the liquid crystal layer 3 may be positioned at one or more corresponding openings.

According to one or more embodiments, the lower insulating layer 311 and the upper insulating layer 313 may not be required.

A lower polarizer (not illustrated) may be disposed below the insulation substrate 110, and an upper polarizer may be disposed above the upper insulating layer 313. Each of the polarizers may include a polarized element for generating polarization and a tri-acetyl-cellulose (TAC) layer for ensuring durability. In one or more embodiments, directions in transmissive axes of the upper polarizer and the lower polarizer may be vertical or parallel to each other.

As can be appreciated from the foregoing discussion, the capping layer 350 and the second black matrix 225 may be formed after the liquid crystal layer 3 has been injected into the microcavity 305. Therefore, the second black matrix 225 may not block the injection of liquid crystal for forming the liquid crystal layer 3. Advantageously, the liquid crystal layer 3 may be substantially easily and efficiently formed.

In one or more embodiments, as illustrated in FIG. 7, the liquid crystal layer 3 may not leak through the liquid crystal injection hole 335, which is sealed by at least the capping layer 350. In one or more embodiments, if the material of the second black matrix 225 directly contacts the liquid crystal layer 3, the material of the second black matrix 225 may cause contamination and/or deterioration to the liquid crystal layer 3 during or after a manufacturing process of the second black matrix 225, and the capping layer 350, which is disposed between the liquid crystal layer 3 and the second black matrix 225 may prevent such contamination and/or deterioration.

As can be appreciated from the foregoing, the formation process of liquid crystal layer 3 may be performed between the formation process of the first black matrix 220 and the formation process of the second black matrix 225, such that the formation of the liquid crystal layer 3 may not be obstructed by the second black matrix 225. The first black matrix 220 and the second black matrix 225 may be formed in two separate processes and may be located at two different layers in the liquid crystal display.

In one or more embodiments, as discussed with reference to FIGS. 12 to 14, a first black matrix 220 and a second black matrix 225, i.e., two portions of a combined black matrix, may be substantially simultaneously formed in one process.

Figure 12:
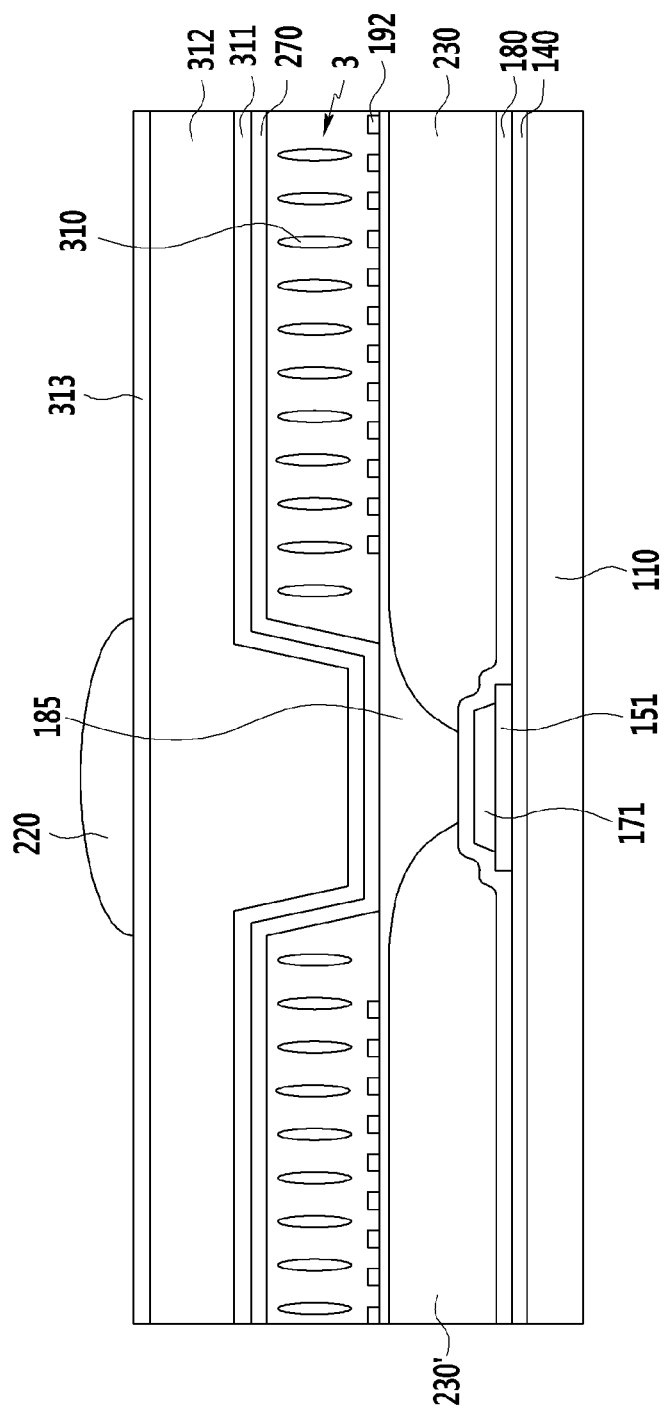
FIGS. 12 and 13 are cross-sectional views illustrating a liquid crystal display according to one or more embodiments of the present invention.
Figure 13:
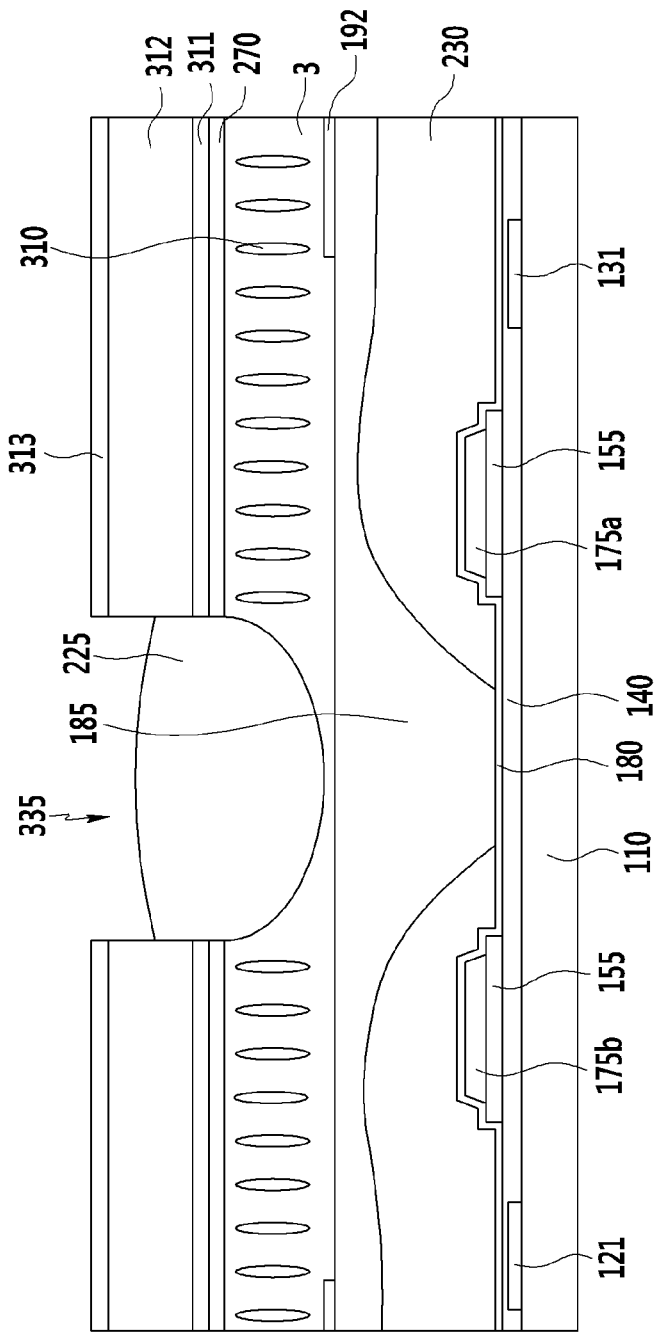

FIGS. 12 and 13 are cross-sectional views illustrating a liquid crystal display, e.g., the liquid crystal display of FIG. 1, according to one or more embodiments of the present invention, and FIG. 14 is a plan view illustrating positions of a first black matrix and a second black matrix in the liquid crystal display of FIGS. 12 and 13.

FIGS. 12 and 13 may be cross-sectional views taken along a cross-sectional line II-II indicated in FIG. 1 and a cross-sectional line III-III indicated in FIG. 1, respectively. As can be appreciated from FIGS. 12 and 13, both the first black matrix 220 and the second black matrix 225 may be positioned at the upper side (i.e., a same side) with respect to the liquid crystal layer 3. In one or more embodiments, the second black matrix 225 may be configured to seal the liquid crystal injection hole 335. In one or more embodiments, an additional capping layer may be formed to seal the liquid crystal injection hole 335.

In the liquid crystal display, gate line 121 and a storage voltage line 131 are formed on an insulation substrate 110 made of transparent glass, transparent plastic, or a different transparent substrate material. The gate line 121 includes a first gate electrode 124$a$, a second gate electrode 124$b$, and a third gate electrode 124$c$. The storage voltage line 131 includes storage electrodes 135$a$ and 135$b$ and a protrusion 134 protruding in the gate line 121 direction (i.e., the horizontal direction). The storage electrodes 135$a$ and 135$b$ may form a structure that surrounds a first subpixel electrode 192$h$ and a second subpixel electrode 192$l$ of a front pixel. A horizontal portion of the storage electrode 135$b$ may be one wiring which is not separated from the horizontal portion of the front pixel.

A gate insulating layer 140 is formed on the gate line 121 and the storage voltage line 131. A semiconductor 151 positioned below a data line 171, portions of a semiconductor 155 positioned below one or more drain electrodes (e.g., a drain electrode 175$b$), and a semiconductor 154 positioned at a channel part of a thin film transistor are formed on the gate insulating layer 140.

A plurality of ohmic contacts may be respectively formed on the semiconductors 151, 154, and 155 and between the data line 171 and the one or more source electrodes and/or the one or more drain electrodes, the ohmic contacts being omitted in the drawings.

On the semiconductors 151, 154, and 155 and the gate insulating layer 140, a set of data conductors that includes a plurality of data lines 171 including a first source electrode 173$a$ and a second source electrode 173$b$, a first drain electrode 175$a$, a second drain electrode 175$b$, a third source electrode 173$c$, and a third drain electrode 175$c$ is formed.

The first gate electrode 124$a$, the first source electrode 173$a$, and the first drain electrode 175$a$ form a first thin film transistor together with the semiconductor 154, and a channel of the thin film transistor is formed at the semiconductor portion 154 between the first source electrode 173$a$ and the first drain electrode 175$a$. Analogously, the second gate electrode 124$b$, the second source electrode 173$b$, and the second drain electrode 175$b$ form a second thin film transistor together with the semiconductor 154, and a channel of the thin film transistor is formed at the semiconductor portion 154 between the second source electrode 173$b$ and the second drain electrode 175$b$. The third gate electrode 124$c$, the third source electrode 173$c$, and the third drain electrode 175$c$ form a third thin film transistor together with the semiconductor 154, and a channel of the thin film transistor is formed at the semiconductor portion 154 between the third source electrode 173c and the third drain electrode 175c.

The data line 171 of may have a structure with a narrow width in a thin film transistor formation region near an extension 175c' of the third drain electrode 175c. This structure is for keeping a distance from the adjacent wiring and reducing signal interference. In one or more embodiments, the structure may not be required. A first passivation layer 180 is formed on the data conductors 171, 173c, 175a, 175b, and 175c and the exposed semiconductor 154 portion. The first passivation layer 180 may include an inorganic insulator, such as at least one of silicon nitride (SiNx) and silicon oxide (SiOx), or an organic insulator.

A color filter 230 is formed on the first passivation layer 180. The color filter 230 having the same color is formed in adjacent pixels in a vertical direction (i.e., the data line direction). Adjacent pixels in a horizontal direction (i.e., the gate line direction) have color filters 230 and 230' having different colors, and two color filters 230 and 230' may be substantially simultaneously formed and may overlap each other over the data line 171. Each of the color filters 230 and 230' may display one color of a set of primary colors such as three primary colors of red, green, and blue. In one or more embodiments, each of the color filters 230 and 230' may display one color of cyan, magenta, yellow, and white-based colors.

A second passivation layer 185 may cover the color filter 230 and may be formed on the color filter 230. The second passivation layer 185 may contain an inorganic insulator, such as at least one of silicon nitride (SiNx) and silicon oxide (SiOx), or an organic insulator. As illustrated in cross-sectional views of FIGS. 12 and 13, in the case where a step occurs due to a thickness difference and/or thickness variation associated with the color filter 230, the second passivation layer 185 may reduce or compensate the thickness difference and/or the thickness variation; the second passivation layer 185 may server as a planarization layer disposed over the color filter 230.

A first contact hole 186a and a second contact hole 186b which expose the first drain electrode 175a and an extension 175b' of the second drain electrode 175b, respectively, are formed in (and/or are formed through) one or more of the color filter 230 and the passivation layers 180 and 185. A third contact hole 186c which exposes a protrusion 134 of the storage voltage line 131 and the extension 175c' of the third drain electrode 175c is formed in (and/or is formed through) on or more of the color filter 230 and the passivation layers 180 and 185.

In one or more embodiments, the contact holes 186a, 186b, and 186c are formed in (and/or are formed through) the color filter 230, even if etching the color filter 230 may be more difficult than etching the passivation layers 180 and 185 because of material properties. In one or more embodiments, the material used for forming the color filter 230 may be formed at position corresponding to the contact holes 186a, 186b, and 186c before etching the color filter 230.

On the second passivation layer 185, a pixel electrode 192 including the first subpixel electrode 192h and the second subpixel electrode 192l is formed. The pixel electrode 192 may be made of a transparent conductive material, such as ITO or IZO.

The first subpixel electrode 192h and the second subpixel electrode 192l are adjacent to each other in a column direction. Each of the first subpixel electrode 192h and the second subpixel electrode 192l may have an overall quadrangular shape, and may include a cross stem structure having a horizontal stem and a vertical stem crossing the horizontal stem. Each of the first subpixel electrode 192h and the second subpixel electrode 192l may be divided into four subregions by the horizontal stem and the vertical stem, and each subregion may include a plurality of minute branches.

The minute branches of the first subpixel electrode 192h and the second subpixel electrode 192l form an angle of approximately in a range of 40 to 45 degrees with the gate line 121 or the horizontal stem. The minute branches of two adjacent subregions may be perpendicular to each other. A width of the minute branch may be gradually increased. Distances between the minute branches may be different from each other.

The first subpixel electrode 192h and the second subpixel electrode 192l are physically and electrically connected with the first drain electrode 175a and the second drain electrode 175b through the contact holes 186a and 186b and receive data voltage from the first drain electrode 175a and the second drain electrode 175b.

A connecting member 194 electrically connects the extension 175c' of the third drain electrode 175c and the protrusion 134 of the storage voltage line 131 through the third contact hole 186c. As a result, a part of the data voltage applied to the second drain electrode 175b is divided through the third source electrode 173c, and a magnitude of the voltage applied to the second subpixel electrode 192l may be smaller than a magnitude of the voltage applied to the first subpixel electrode 192h.

An area of the second subpixel electrode 192l may be in a range of 1 to 2 times an area of the first subpixel electrode 192h.

An opening for collecting gas discharged from the color filter 230 and a cover for covering the opening may be formed in the second passivation layer 185. The cover may be formed of the same material as the pixel electrode 192. The opening and the cover may prevent gas discharged from the color filter 230 from being transferred to other elements. In one or more embodiments, the opening and the cover may not be required.

A microcavity 305 is positioned on the second passivation layer 185 and the pixel electrode 192 (and is positioned between the second passivation layer 185 and a common electrode 270), and the liquid crystal layer 3 is formed in the microcavity. An alignment layer (not illustrated) may be formed between the second passivation layer 185 and the liquid crystal layer 3 in order to align the liquid crystal molecules injected in the microcavity 305. The alignment layer may contain at least one of polyamic acid, polysiloxane, and polyimide, which are generally used in a liquid crystal alignment layer.

The liquid crystal layer 3 is formed in the microcavity 305 (and on the alignment layer). The liquid crystal molecules 310 are initially aligned by the alignment layer and the alignment direction is changed according to the applied electric field. A height of the liquid crystal layer 3 corresponds to a height of the microcavity 305. A thickness of the liquid crystal layer 3 may be in a range of 2.0 μm to 3.6 μm.

The liquid crystal material for forming the liquid crystal layer 3 may be injected into the microcavity 305 using capillary force in a liquid crystal injection hole 335. The alignment layer may be formed using capillary force.

The common electrode 270 is positioned above the microcavity 305 and the liquid crystal layer 3 with the microcavity 305 and the liquid crystal layer 3 being disposed between the common electrode 270 and the second passivation layer 185. The common electrode 270 may have a curved structure including a protrusion portion (illustrated in FIG. 2) that is disposed above a data line 171 and protrudes (and is convex) toward the data line 171. At least a portion of the first black matrix 220 may be disposed between the protrusion portion and the data line 171. The protrusion portion may directly contact the second passivation layer 185. A portion of the roof material 312 and a portion of the lower insulating layer 311 may be disposed inside a recess structure of the protrusion portion. The common electrode 270 is not formed in the liquid crystal injection hole 335 portion (which corresponds to the transistor formation region); the liquid crystal injection hole 335 may be disposed between two portions of the common electrode 270, as illustrated in FIG. 3. The common electrode 270 may extend in a gate line direction (i.e., the horizontal direction).

The common electrode 270 is made of a transparent conductive material, such as ITO or IZO, and serves to generate an electric field together with the pixel electrode 192 to control an alignment direction of the liquid crystal molecules.

A lower insulating layer 311 is positioned on the common electrode 270. The lower insulating layer 311 may contain an inorganic insulating material such as silicon nitride (SiNx).

A roof layer 312 is formed on the lower insulating layer 311. The roof layer 312 may serve to support a space (microcavity 305) to be formed between the pixel electrode 192 and the common electrode 270. The roof layer 312 according to one or more embodiments serves to support the microcavity 305 above the common electrode 270 at a predetermined thickness.

An upper insulating layer 313 is formed on the roof layer 312. The upper insulating layer 313 may contain an inorganic insulating material such as silicon nitride (SiNx).

The liquid crystal injection hole 335 may be formed through the lower insulating layer 311, the roof layer 312, and the upper insulating layer 313 in the transistor formation region, wherein a liquid crystal may be injected through the liquid crystal injection hole 335 into the microcavity 305. The liquid crystal injection hole 335 may be used for removing the sacrificial layer 300 of FIG. 4 in the process of forming the microcavity 305.

The lower insulating layer 311 and the upper insulating layer 313 may be laminated with portions disposed in the transistor formation region corresponding to a position for forming the liquid crystal injection hole 335. In one or more embodiments, the roof layer 312 may not be formed in the transistor formation region; therefore, the liquid crystal injection hole 335 may be formed by removing portions of the lower insulating layer 311 and upper insulating layer 313 in the transistor formation region without removing portions of the roof layer 312. The sacrificial layer 300 may be exposed through the liquid crystal injection hole 335 after a portion of the common electrode 270 that is positioned in the transistor formation region has been removed.

According to one or more embodiments, the roof layer 312, the upper insulating layer 313, and the lower insulating layer 311 are etched in a same etching process in the transistor formation region to form the liquid crystal injection hole 335.

According to one or more embodiments, the lower insulating layer 311 and the upper insulating layer 313 may not be required.

The first black matrix 220 and the second black matrix 225 are formed on the liquid crystal layer 3, wherein the first black matrix 220 may be formed on the upper insulating layer 313, and wherein the second black matrix 225 may be formed in the transistor formation region and formed in the liquid crystal injection hole 335. The first black matrix 220 and the second black matrix 225 may be made of one or more same non-transmissive materials and may be substantially simultaneously formed in a same process step using a same mask.

The first black matrix 220 may overlap the data line 171 and may extend in a vertical direction, wherein at least a portion of one or more of the upper insulating layer 313, the roof layer 312, the lower insulating layer 311, the common electrode 270, the second passivation layer 185, and the first passivation layer 180 may be disposed between the first black matrix 220 and the data line 171. The second black matrix 225 may have a portion positioned inside the liquid crystal injection hole and may extend in a horizontal direction in the transistor formation region.

As illustrated in the plan views of FIG. 14, the first black matrix 220 (which include portions extending in the vertical direction) and the second black matrix 225 (which include portions extending in the horizontal direction) may form a lattice structure having openings. A substantial portion of the pixel electrode 192, a substantial portion of the color filter 230, and a substantial portion of the liquid crystal layer 3 may be positioned at one or more corresponding openings.

In one or more embodiments, as discussed with reference to FIGS. 1 to 7, the first black matrix 220 and the second black matrix 225 may be formed at different layers in a liquid crystal display. In one or more embodiments, as discussed with reference to FIG. 1 and FIGS. 12 to 14, the first black matrix 220 and the second black matrix 225 may be connected to each other at a same layer in a liquid crystal display.

The second black matrix 225 may seal (and/or cap) the liquid crystal injection hole 335 so that the liquid crystal layer 3 may not leak through the liquid crystal injection hole 335 after the liquid crystal layer 3 has been injected through the liquid crystal injection hole 335 into the microcavity 305.

In one or more embodiments, as illustrated in FIG. 3, a portion of the liquid crystal layer 3 may be disposed between the second passivation layer 185 and the second black matrix 225. In one or more embodiments, the second black matrix 225 may directly contact the second passivation layer 185 and thus may separate a first portion of the liquid crystal layer 3 from a second portion of the liquid crystal layer 3.

A lower polarizer (not illustrated) may be positioned below the insulation substrate 110, and an upper polarizer may be positioned above the upper insulating layer 313. Each of the polarizers may include a polarized element for generating polarization and a tri-acetyl-cellulose (TAC) layer for ensuring durability. In one or more embodiments, directions in transmissive axes of the upper polarizer and the lower polarizer may be vertical or parallel to each other.

The manufacturing method of the liquid crystal display discussed with reference to FIGS. 12 to 14 may include steps that are substantially similar to steps in the manufacturing process discussed with reference to one or more of FIGS. 1 to 7. Nevertheless, as can be appreciated from the discussion association with FIGS. 12-14, the first black matrix 220 may not be formed immediately after the formation of the color filter 230; instead, the first black matrix 220 may be formed when the second black matrix 225 is formed. Advantageously, total formation time for the first black matrix 220 and the second black matrix 225 may be minimized.

While this invention has been described in connection with what is presently considered to be practical embodiments, it is to be understood that the invention is not limited to the disclosed embodiments. The invention is intended to cover various modifications and equivalent arrangements included within the spirit and scope of the appended claims.

<Description of symbols>

| | |
|---|---|
| 110: Insulation substrate | 121: Gate line |
| 124: Gate electrode | 131: Storage voltage line |
| 140: Gate insulating layer | 151, 152, and 155: Semiconductor |
| 171: Data line | 173: Source electrode |
| 175: Drain electrode | 180, 185: Passivation layer |
| 186: Contact hole | 192: Pixel electrode |
| 194: Connecting member | 220: First black matrix |
| 225: Second black matrix | 230: Color filter |
| 270: Common electrode | 3: Liquid crystal layer |
| 305: Microcavity | 300: Sacrificial layer |
| 311: Lower insulating layer | 312: Roof layer |
| 313: Upper insulating layer | 335: Liquid crystal injection hole |
| 350: Capping layer | |

What is claimed is:

1. A liquid crystal display device comprising:
a substrate;
a pixel electrode disposed on the substrate;
a common electrode overlapping the pixel electrode, wherein a liquid crystal injection hole is formed through at least the common electrode;
a liquid crystal layer disposed between the pixel electrode and the common electrode; and
a first light-blocking element disposed inside the liquid crystal injection hole,
wherein the liquid crystal display device includes only one substrate, and
wherein the common electrode and the pixel electrode are disposed on the substrate.

2. The liquid crystal display device of claim 1, further comprising:
a transistor electrically connected to the pixel electrode; and
a gate line electrically connected to the transistor and configured to transmit a gate signal to the transistor,
wherein the first light-blocking element extends parallel to the gate line and overlaps the transistor.

3. The liquid crystal display device of claim 1, wherein the first light-blocking element is disposed between a first portion of the liquid crystal layer and a second portion of the liquid crystal layer.

4. The liquid crystal display device of claim 1, wherein a portion of the liquid crystal layer is disposed between the first light-blocking element and the substrate.

5. The liquid crystal display device of claim 1, wherein the first light-blocking element directly contacts the liquid crystal layer.

6. The liquid crystal display device of claim 1, further comprising a capping layer that is made of a material different from a material of the first light-blocking element, wherein a first portion of the capping layer is disposed inside the liquid crystal injection hole and is disposed between the first light-blocking element and the liquid crystal layer.

7. The liquid crystal display device of claim 6, wherein the first light-blocking element is disposed between a second portion of the capping layer and a third portion of the capping layer.

8. The liquid crystal display device of claim 7, wherein the second portion of the capping layer and the third portion of the capping layer are disposed between a first portion of the common electrode and a second portion of the common electrode.

9. The liquid crystal display device of claim 1, further comprising a second light-blocking element, the second light-blocking element being directly connected to the first light-blocking element and extending substantially perpendicular to the first light-blocking element.

10. The liquid crystal display device of claim 1, further comprising a second light-blocking element, wherein the first light-blocking element is disposed at a first side with respect to the liquid crystal layer, and wherein the second light-blocking element is disposed at a second side with respect to the liquid crystal layer and extends substantially perpendicular to the first light-blocking element in a plan view of the liquid crystal display device.

* * * * *